US012675374B2

(12) United States Patent
Vu et al.

(10) Patent No.: US 12,675,374 B2
(45) Date of Patent: \*Jul. 7, 2026

(54) CASCADING RECOVERY FRAMEWORK FOR SOFTWARE-AS-A-SERVICE DATA

(71) Applicant: Rubrik, Inc., Palo Alto, CA (US)

(72) Inventors: Amelia Vu, Mountain View, CA (US); Suman Swaroop, San Francisco, CA (US); Anshul Gupta, Mountain View, CA (US); Sean Lobo, San Francisco, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/955,782

(22) Filed: Nov. 21, 2024

(65) Prior Publication Data

US 2026/0140833 A1 May 21, 2026

(51) Int. Cl.
  *G06F 11/10* (2006.01)
  *G06F 11/1446* (2026.01)

(52) U.S. Cl.
  CPC ...... *G06F 11/1469* (2013.01); *G06F 2201/84* (2013.01)

(58) Field of Classification Search
  None
  See application file for complete search history.

(56) References Cited

U.S. PATENT DOCUMENTS

| | | | |
|---|---|---|---|
| 8,606,752 B1 | 12/2013 | Beatty et al. | |
| 10,853,182 B1 | 12/2020 | Vig et al. | |
| 10,872,059 B2 | 12/2020 | Desai et al. | |
| 11,119,862 B2 | 9/2021 | Dewey et al. | |
| 11,941,014 B1 * | 3/2024 | Das | G06F 16/219 |
| 12,235,737 B1 | 2/2025 | Bin et al. | |
| 2010/0082553 A1 * | 4/2010 | Beatty | G06F 11/1469 |
| | | | 711/E12.001 |
| 2012/0136832 A1 * | 5/2012 | Sadhwani | G06F 11/1469 |
| | | | 707/E17.007 |
| 2014/0201161 A1 | 7/2014 | Kumarasamy et al. | |
| 2014/0279526 A1 | 9/2014 | Jackson | |
| 2015/0310179 A1 | 10/2015 | Chengat et al. | |
| 2017/0212811 A1 | 7/2017 | Kashnikov et al. | |
| 2018/0314603 A1 | 11/2018 | Gibbons et al. | |

(Continued)

*Primary Examiner* — Jau Shya Meng

(74) *Attorney, Agent, or Firm* — Holland & Hart LLP

(57) ABSTRACT

Methods, systems, and devices for data management are described. Software-as-a-service (SaaS) applications may host customers' information in a distributed environment that is not directly accessible to the customers. SaaS applications may store data in the form of relational tables, meaning that data is organized in tables that have hierarchical relationships. SaaS tables may include permissive relationships to other tables (e.g., a row in one table may point to data in another table). Restoration of a SaaS computing object (e.g., one or more SaaS tables) may involve restoration of other computing objects in both dependent and permissive relationships with the SaaS computing object. Cascading metadata logic may be stored in association with a particular computing object that may indicate, for each relationship, whether to perform a restore operation and a type of cascading restore to perform when the particular computing object is to be restored to a particular computing environment.

20 Claims, 11 Drawing Sheets

(56)          References Cited

U.S. PATENT DOCUMENTS

| 2021/0117120 | A1 | 4/2021 | Edwards et al. |
| 2021/0365185 | A1 | 11/2021 | Shtarkman et al. |
| 2022/0171536 | A1 | 6/2022 | Watson |
| 2023/0128602 | A1 | 4/2023 | Park et al. |
| 2023/0142346 | A1 | 5/2023 | Menezes et al. |
| 2024/0176796 | A1 | 5/2024 | Sarel et al. |
| 2024/0248991 | A1 | 7/2024 | Chinni et al. |
| 2024/0273226 | A1 | 8/2024 | Brajkovic et al. |

* cited by examiner

500

625    605    620

☐ Selectable element 610

⌄ Dropdown element 615

600

CASCADING RECOVERY FRAMEWORK FOR SOFTWARE-AS-A-SERVICE DATA

FIELD OF TECHNOLOGY

The present disclosure relates generally to data management, including techniques for cascading recovery framework for software-as-a-service data.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
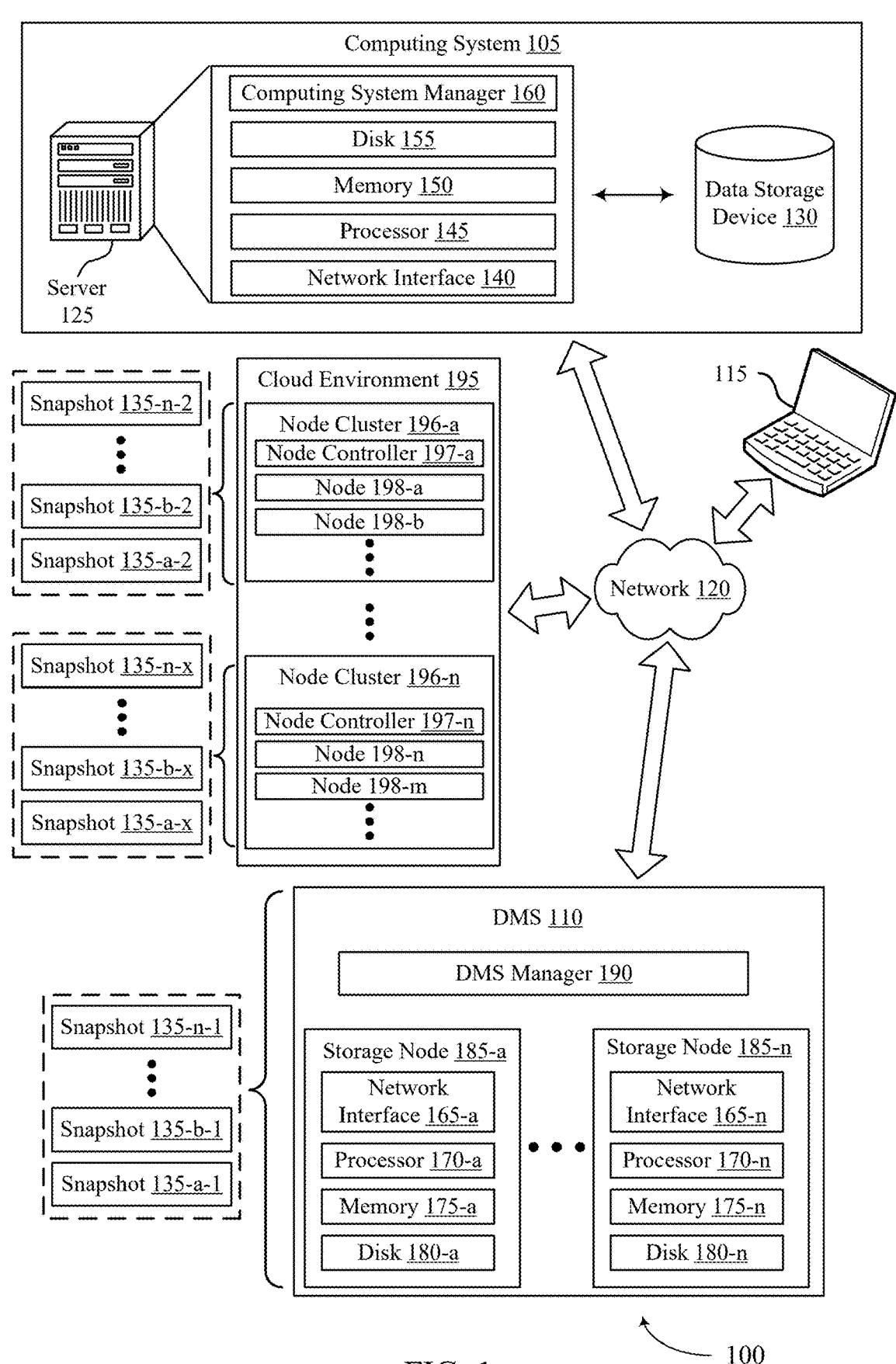
FIG. 1 illustrates an example of a computing environment that supports cascading recovery framework for Software-as-a-service (SaaS) data in accordance with aspects of the present disclosure.

Software-as-a-service (SaaS) applications (e.g., platforms) such as Salesforce and Jira, among other examples, may host their customers' information in a distributed environment that is not directly accessible to the customers—e.g., customers of a SaaS application may have access to their associated data only via the SaaS application, such as through one or more application programming interfaces (APIs) associated with the SaaS application. Additionally, many SaaS applications store their customers' data in the form of relational tables, meaning that data is organized in tables that have relationships between the different tables. For example, for an organization that is a customer of a SaaS application, data for customers of that organization may have parent relationships with sales and location data for those customers. A data management system (DMS) may maintain and store snapshots of SaaS computing objects for a customer of the DMS.

A relationship between one SaaS computing object and another may be dependent or non-dependent. If a first computing object must be restored or available at the restore environment before a second computing object can be restored to the restore environment, then the second computing object may be described as having a dependent relationship with the first computing object (e.g., restoration of the second computing object is dependent upon a prior restoration of the first computing object or existence of the first computing object at the restore environment). For example, in a parent-child relationship, a child object may have a dependent relationship with a parent object, and hence the parent object must be restored or available at the restore environment before the child object can be restored to the restore environment. Accordingly, in the example of customer data being the parent of sales and location data for a customer, a customer object would need to be available or restored at the restore environment prior to restoration of the child sales or location data to the restore environment.

Alternatively, if a second computing object has a lookup reference to or other linking with a first computing object, but the second computing object can be restored regardless of whether the first computing objects is previously restored or otherwise in existence at the restore environment, then the second computing object may be described as having a non-dependent relationship with the first computing object. A non-dependent relationship may alternatively be referred to as a permissive relationship. In some such examples, where a computing object has a permissive relationship with a referenced computing object, deletion of the referenced computing object may result in an unlinking between the computing objects. As one example, a parent computing object may have a permissive or non-dependent relationship with the child computing objects of the parent computing object (e.g., a child may be dependent upon and thus have a dependent relationship with a parent, but the parent may not be dependent upon and thus may have a non-dependent relationship with the child).

Aspects of this disclosure involve configurable cascading recovery operations for a DMS involving computing objects of SaaS applications in both dependent and permissive relationships (e.g., cascading recovery operations may refer to recovery operations that flow from one another due to relationships-such as dependent relationships, permissive relationships, or both-between computing objects that are the subject of the recovery operations). For example, cascading metadata logic may be stored and accessible to the DMS in association with a particular computing object that may indicate, for each dependent relationship (e.g., parent relationship), a type of cascading restore to perform in the event the particular computing object is to be restored to a particular computing environment. The cascading metadata logic may further indicate, for each permissive relationship, whether to restore the corresponding computing object and, if so, a type of cascading restore to perform. Different types of restore operations may exist, including create restore, link restore, or update restore operations. As one example, a create restore operation may involve restoring a related object if the related object does not already exist at the target restore computing environment in the event a particular computing object is requested to be restored. For example, in the case of a parent relationship, a child computing object may not be restored at a target restore computing environment until a parent computing object exists at the target restore computing environment. As another example, a link restore operation may involve updating a link in the particular restored computing object to point to the related computing object (e.g., to the address of the related computing object) that already exists at the target restore computing environment. And as another example, an update restore operation may involve restoring the related computing object using a snapshot that corresponds to the snapshot used to restore the particular restored computing object even if the related computing object already exists at the target computing environment, for example, to restore the relationships between the computing objects to a requested point in time.

Additionally, different cascading recovery operations may be configured for particular computing objects based on a purpose of a restore or a type of restore. For example, restores to production environments, where computing objects already exist, may, may involve more linking and create restore operations, while restores to sandbox or testing environments, where the other computing objects may be stale or may not exist, may involve more create and update restore operations.

FIG. 1 illustrates an example of a computing environment 100 that supports cascading recovery framework for SaaS data in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through SaaS or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150), or the data storage device 130) that are virtualized may be accessed by applications as a virtual disk.

The DMS 110 may provide one or more data management services for data associated with the computing system 105 and may include DMS manager 190 and any qantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation fre-*d*.uency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples, the DMS 110 may manage the extraction and storage of snapshots of a SaaS application. For example, the computing system 105 may be a SaaS application. SaaS applications may host customer information in a distributed environment that is not directly accessible to the customers—e.g., customers of a SaaS application may have access to their associated data only via the SaaS application, such as through one or more APIs associated with the SaaS application. Relational SaaS applications may store data in the form of relational tables, meaning that data is organized in tables that have hierarchical parent and child relationships. Further, tables or computing objects in SaaS applications may have non-dependent (e.g., permissive) relationships. For example, one object (e.g., an entry in a table) may have a lookup reference to another object or record, but deletion of the referenced object or record may result in an unlinking between the objects.

The DMS 110 may enable configurable cascading recovery operations involving computing objects of SaaS applications in both dependent and permissive relationships. For example, cascading metadata logic may be stored in association with a particular computing object (e.g., in association with a snapshot) that may indicate, for each dependent relationship (e.g., parent relationship), a type of cascading restore to perform in the event the particular computing object is to be restored to a particular computing environment. The cascading metadata logic may further indicate, for each permissive relationship, whether to restore the corresponding computing object and, if so, a type of cascading restore to perform. Different types of restore operations may exist, including create restore, link restore, or update restore operations. As one example, a create restore operation may involve restoring a related object if the related object does not already exist at the target restore computing environment in the event a particular computing object is requested to be restored. For example, in the case of a parent relationship, a child computing object may not be restored at a target restore computing environment until a parent computing object exists at the target restore computing environment. As another example, a link restore operation may involve updating a link in the particular restored computing object to point to the related computing object that already exists at the target restore computing environment. And as another example, an update restore operation may involve restoring the related computing object using a snapshot that corresponds to the snapshot used to restore the particular restored computing object even if the related computing object already exists at the target computing environment, for example, to restore the relationships between the computing objects to a requested point in time.

Additionally, different cascading recovery operations may be configured at the DMS 110 for particular computing objects based on a purpose of a restore or a type of restore. For example, restores to production environments may involve more different cascading restore operations than restores to sandbox environments for testing purposes. For example, for a restore to a production environment, where the other computing objects already exist, the restore logic may involve more linking and create restore operations, while for a restore to a sandbox or testing environment, where the other computing objects may not exist, the restore logic may involve more create and update restore operations.

Figure 2:
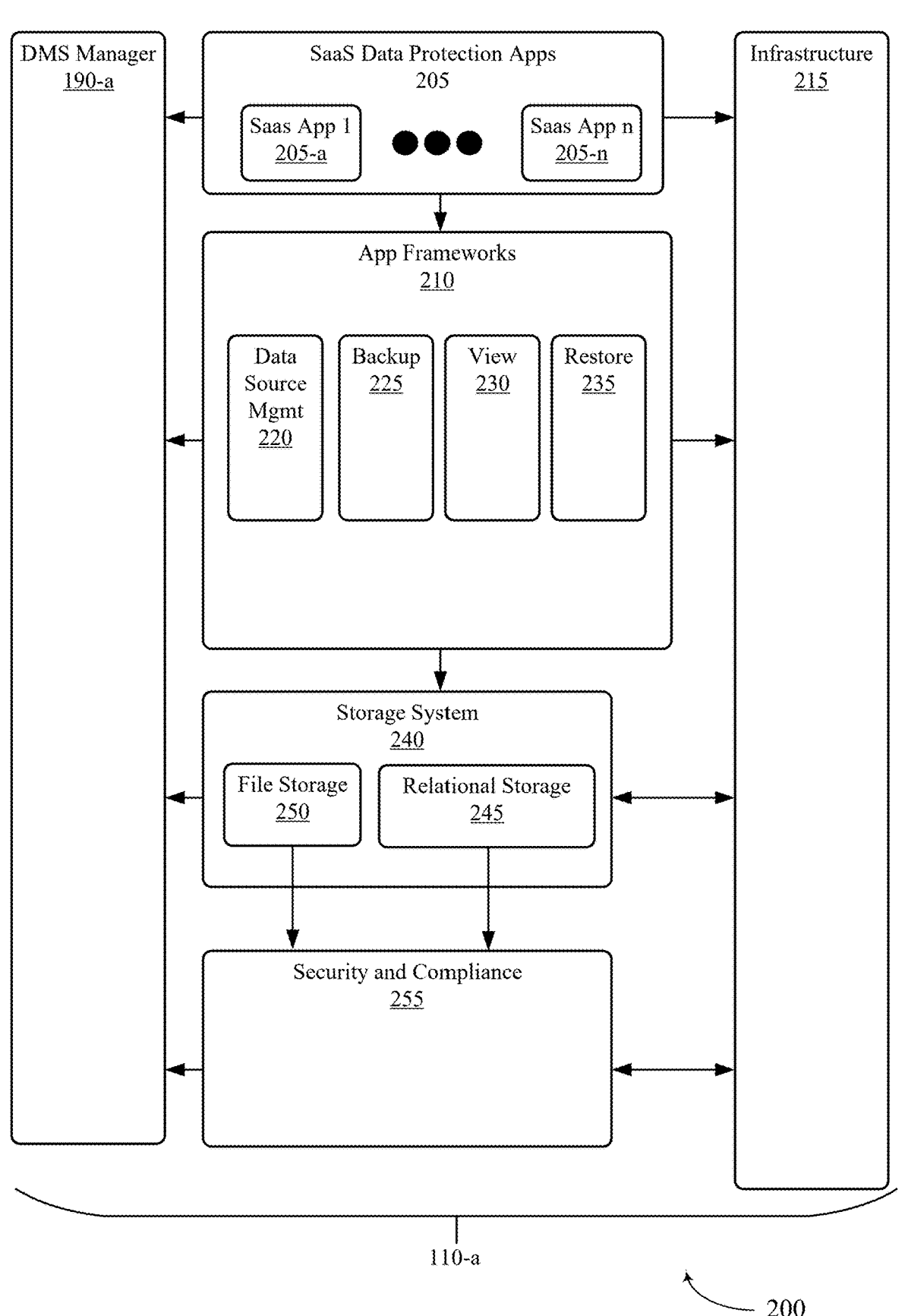
FIG. 2 shows an example of a data protection and recovery system that supports cascading recovery framework for SaaS data in accordance with aspects of the present disclosure.

FIG. 2 shows an example of a data protection and recovery system 200 that supports cascading recovery framework for SaaS data in accordance with aspects of the present disclosure. The data protection and recovery system 200 may implement or may be implemented by aspects of the computing environment 100. For example, the data protection and recovery system 200 may be implemented by a DMS 110-*a*, which may be an example of a DMS 110 as described herein.

The DMS 110-*a* may include a DMS manager 190-*a*, which may be an example of a DMS manager 190 as described herein. The DMS 110-*a* may support a generic framework that works for backup and restore of multiple relational SaaS applications. For example, the DMS 110-*a* may support multiple relational SaaS applications via including generic application frameworks 210 that may work with SaaS data protection applications 205 that are specific to different types of SaaS applications. An administrator of the DMS 110-*a* may specify a schema for a particular SaaS application and build connectors for the SaaS data protection applications 205 to the application frameworks 210, the DMS manager 190-*a*, and infrastructure 215 of the DMS 110-*a*. The infrastructure 215 may include data stores (e.g., storage nodes 185 as described with reference to FIG. 1), network connections to an external storage environment (e.g., the node clusters 196 at the cloud environment 195 as described with reference to FIG. 1), region support, availability management, fault tolerance, and client libraries.

As described herein, the DMS 110-*a* may include one or more SaaS data protection applications 205 configured to perform backup and recovery operations for different respective SaaS applications. For example, one SaaS data protection application 205 may be configured to perform backup and recovery operations for JIRA, and another SaaS data protection application 205 may be configured to perform backup and recovery operations for Salesforce. Each of the SaaS data protection applications 205 may include an application specific code and an application specific user interface (UI) (e.g., which may be displayed at a computing device 115 as described with reference to FIG. 1). A SaaS data protection application 205 may call one or more APIs for the associated SaaS application to retrieve data from the SaaS application for backup purposes or to send data to the SaaS application or any other target environment for restore purposes.

The application frameworks 210 may include common code shared across the one or more SaaS data protection applications 205. Application frameworks 210 may be realized via libraries, interfaces, or automated code generation. The application frameworks 210 may include a data source management framework 220, a backup framework 225, a view framework 230, and a restore framework 235.

Snapshots of the SaaS applications may be stored in the storage system 240. For example, the storage system may be one or more storage nodes 185 as described with reference to FIG. 1 or node clusters 196 at the cloud environment 195 as described with reference to FIG. 1. The storage system 240 may include a relational storage 245 to store relational data associated with relational SaaS applications and a file storage 250) to store data from non-relational SaaS applications or applications other than SaaS applications. For example, the relational storage 245 may be a SQL database. The application frameworks 210) may act as an orchestrating structure between the SaaS data protection applications 205 and the relational storage 245 for relational SaaS applications. For example, the application frameworks 210 may control data flow between the relational storage 245 and the SaaS data protection applications 205 (and the associated relational SaaS applications).

The DMS 110-*a* may include a security and compliance framework 255. For example, the security and compliance framework 255 may encrypt data in the storage system (e.g., using bring your own key (BYOK) or key rotation encryption techniques) or may monitor for compliance with encryption re-*d*.uirements. In some examples, the security and compliance framework 255 may include security applications, configurations or controls, such as internal access controls (e.g., for administrators of the DMS 110-*a*).

The view framework 230 may control a UI (e.g., displayed at a computing device 115 as described with reference to FIG. 1) for the DMS 110-*a*. For example, an administrator of the DMS 110-*a* may control backup and recovery operations for the SaaS applications associated with the SaaS data protection applications 205 via a UI controlled by the view framework 230. For example, an administrative user of the DMS 110-*a* may request to perform a restore operation via a via a UI controlled by the view framework 230. As another example, an administrative user may configure cascading recovery operations for computing objects of SaaS applications via a UI controlled by the view framework 230. The view framework 230 may implement role based access control (RBAC), may enable event creation or reporting associated with data protection or restoration for the SaaS applications associated with the SaaS data protection applications 205. The view framework 230 may display object hierarchies and/or permissive relationships for SaaS applications at a UI or may enable administrators to search or browse for data or the SaaS applications associated with the SaaS data protection applications 205.

The data source management framework 220 may include authentication framework (e.g., to access customer accounts at the SaaS applications). The data source management framework 220 may also include an API framework which may store which APIs are associated with each of the SaaS applications associated with the SaaS data protection applications 205. The API framework may control data rates (e.g., throttle data) retrieved or pushed through the APIs. The backup framework 225 may control backup operations for each of the SaaS applications associated with the SaaS data protection applications 205 (e.g., backup scheduling, skipping of items, failsafe, and resumability) in accordance with the data source management framework 220 or any instructions or commands received from the view framework 230. The restore framework 235 may control restore operations for each of the SaaS applications associated with the SaaS data protection applications 205 (e.g., restore scheduling, cascading restore, conflict resolution) in accordance with the data source management framework 220 or any instructions or commands received from the view framework 230.

The SaaS data protection applications 205 may enable automated discovery of objects for the associated SaaS applications. Each SaaS data protection application 205 may implement an interface which defines computing objects by calling source APIs.

The backup framework 225 may implement a data access object (DAO) interface which supports statically defined schemas and dynamically fetched schemas from the source SaaS application for each snapshot. As described with reference to FIG. 5, the backup framework 225 and the restore framework 235 may use the concept of logical entities to generalize backup and restore. Backup snapshots for relational SaaS applications may capture not only the data and metadata but also may capture changes in schemas of the tables of the relational SaaS applications.

The restore framework 235 may use a generic cascading search and restore to facilitate the restoration of dependencies in a relational SaaS application. The restore framework 235 may build a generic table graph with pre-defined schemas and relationships per application, which table graph may be pruned based on exclusions received from an administrator (e.g., via the view framework 230). As described herein, the table graph may be built based on configured restore logic for both dependent and permissive relationships. The restore framework 235 may order restore operations based on an entity graph, where the entity graph may be based on the table graph. For example, as dependencies between computing objects and tables in relational SaaS applications may determine the order in which computing objects and tables are restored, and the entity graphs may be used to determine the ordering. For a particular computing object, the computing objects in parent relationships with the particular computing object (e.g., upon which the particular computing object depend) may be created or available at the target restore environment before restoring the particular computing environment. Because a record (e.g., a row within a table) may reference another record within the same table, the ordering of keys within a same table may also be demanded. Accordingly, a key graph per table vertex in the table graph may be used. The key graph may contain keys in self-relationships. Keys may be ordered based on their depth in the topological sort of the key graph. Any keys not involved in any self-relationships may be ordered arbitrarily.

The entity graph may also be used to execute the actual restorations by calling restore functions which may be defined per entity. The restore framework 235 may include a task runner to run tasks associated with restore operations in a specified order. The restore framework 235 may include post processing functions which may perform tasks such as linking objects.

The SaaS data protection applications 205 and the application frameworks 210 may be agnostic to the way that the SaaS application vendors store data. The format in which data is stored in the relational storage 245 may depend on the APIs that are used to retrieve the data from the SaaS applications. For example, if a relational SaaS application completely changes its backend schema, but does not change its APIs, no changes would be implemented at the DMS 110-*a* (e.g., at the associated SaaS data protection applications 205 or the application frameworks 210) as the design of the DMS 110-*a* may not be directly dependent on the actual storage schema of the SaaS application vendor. The schema design for storage of backup data for relational SaaS applications may be based on the APIs input and output for a particular relational SaaS application. Thus absent API changes for a particular relational SaaS application, changes may not be made to the SaaS data protection applications 205 or the way that data is stored in the relational storage

245. If a relational SaaS application changes APIs, but fundamentals of the relational SaaS application remain the same, code changes may be made to the associated SaaS data protection applications 205 to account for the changed APIs (e.g., such changes may not involve large scale data transformation or schema migration for existing customers). Such avoidance of large scale changes may be achieved via the implementation of logical entities. For example, if APIs change for a relational SaaS application, the set of entities or the definition of entities may be changed accordingly (e.g., entities may be defined based on the APIs used to retrieve or restore tables). For example, the code for a SaaS data protection application 205 may be updated to reflect the tables or rows backed up or restored using the same APIs. If a relational Saas application changes both APIs and the way that data is stored, depending on the change, the SaaS data protection applications 205 or the stored data for the relational SaaS application in the relational storage 245 may be changed. Such changes may involve schema migration for new incoming data.

Tables may be the lowest level of definition for a relational SaaS hierarchy which are directly stored into the relational storage 245. As used herein, the term "record" may refer to a row in a table. Tables may have relationships between each other that may be stored as metadata in the relational storage 245. Table relationships may be used during cascading restores or ordering for backup or restore. Table relationships for a computing object may change across snapshots (e.g., the relational storage 245 may provide write and read APIs for relationship changes across snapshots. Table relationships may be similar to foreign key relationships in databases. The table relationship may be between a primary key of one table A (referred to as a parent table) and any column of another table B (referred to as the child table). The column in table B may store an indication of the primary key directly (e.g., as a single key) or may store indications of multiple primary keys into table A (e.g., as an array which point to multiple parents) to allow for multiple cascading. Hence, different types of relationships may be pre-defined in code. Relationships between tables for a relational SaaS application may be defined by an associated SaaS data protection application 205 and stored in the relational storage 245. For example, Table 1 below shows an example relationship structure for relational tables.

TABLE 1

```
type Relationship struct {
    ChildTableName string
    ChildColumnName string
    Type RelationshipType
    ParentTableName string
    ParentColumnName string
    Metadata byte[ ]
}
    type MetadataProto struct {
    cascadeToParent bool,
    cascadeToChild bool,
}
```

Table schemas may be encoded in the relational storage 245. Schemas may be changed across snapshots (e.g., columns may be added, deleted, or renamed) on the fly during an initial phase of a backup of any snapshot. For example, any table may be defined by a type DAO interface which retrieves the uni-*d*.ue name of the table (e.g., via a tablename ( ) function) and retrieves the set of all dependency relationships for the table (e.g., via a GetDependency Relationships ( ) function).

Tables may be static or dynamic. Static tables may be encoded into the backup framework 225 or the SaaS data protection applications 205 for a particular SaaS application. The source APIs may not create or change static tables. Static tables may generally be tables that are application specific. The schema for a static table may be mutated via a code change. If the schema of a static table is changed and deployed into production, the next snapshot will change the schema of that table in the relational storage 245 on the fly (e.g., during the backup).

Dynamic tables may generally be used for custom tables in the source side which are not application specific but customer or snapshot specific. Schemas of dynamic tables may be fetched on the go (e.g., during the backup) and persisted into the relational storage 245.

The schema of static tables may be encoded in golang DAO structs. For example, each table schema may be stored in DAO structs in.go files. There may be one DAO struct for each table which indicates the table's SQL type and other information embedded into struct attributes. Golang reflections may be used to extract additional information to form the table SQL schema. Such DAO structs may also serve as objects to store table rows in a strongly typed manner. For example, a static DAO interface may be given by: type StaticDAO interface {DAO}. Table 2 below shows an example static DAO struct.

TABLE 2

```
type IssueCommentDao struct {
    ID            string  'ColumnID:   "1"   DB:"varchar(20)" Index:key'
    IssueID       int     'ColumnID:   "2"   Index:true'
    IssueKey      string  'ColumnID:   "3"   DB:"varchar(20)"'
    CreateUserID  string  'ColumnID:   "4"   DB:"varchar(10)"
Index:true'
    Body          string  'ColumnID:   "5"   DB:"json"'
    UpdatedUserID string  'ColumnID:   "6"   DB:"varchar(10)"'
    CreatedTime   int     'ColumnID:   "7"'
    UpdatedTime   int     'ColumnID:   "8"'
    JSDPublic     bool    'ColumnID:   "9"'
}
```

In some examples, the columnID field may be mandatory and may be used to detect column renames and type changes. Reflections may automatically interpret the SQL type from corresponding golang types (e.g., "int" for integer, "bool" for Boolean). In some examples, complex types such as varchar and json may be specified using the "SQL" tag. A field may generally not be removed from the DAO struct once added unless that field in not used during restore operations at all, as upon removal, that field may no longer be filled during reads from the datastore. The static DAO struct may be used in schema backup, data backup, search, and restore. The structure of the static DAO struct may first be used during the schema backup, and the API objects may be used at a later time to fill in the DAOs.

Dynamic tables may be used when the full table schema or schema modifications are not known before a backup job and may be fetched from the source SaaS application using APIs during backup. Some SaaS applications, such as JIRA, may not use dynamic tables. A dynamic DAO interface may be given by: type DynamicDAO interface {///implement DAO interface}. Dynamic tables may be mapped during runtime of a backup operation based on the objects provided from a SaaS application via APIs.

In some examples, tables may have permissive relationships with other tables. For example, a row in one table may point to or link to another table or another row in a different table. For example, non-dependent relationships may include tightly coupled data and loosely coupled data. An example dependency relationship may be a JIRA issue and the corresponding parent epic (e.g., child tables/objects may have dependent relationships on parent tables/objects as described herein). An example of non-dependent tightly coupled data may be when the recovery of a record that is the master in a master-detail relationship in Salesforcedot-com (SFDC) results in the recovery of child records. For example, a master record in a master-detail relationship may have a tightly coupled relationship with child records as when a master record is deleted, each of the child records may also be deleted (e.g., by default). An example of a non-dependent loosely coupled relationship may be a lookup relationship in SFDC, where one record has a lookup column to another record, and the deletion of the lookup record results in an unlinking.

In some examples, as described with reference to FIG. 3, the recovery behavior may depend on the recovery destination. For example, if recovering to a production environment, a customer of the DMS 110-*a* may configure minimally intrusive updates. As another example, if recovering to a stale sandbox or testing environment, a customer may configure all directly related data to be created or updated to preview the recovery behavior on production. As such, the restore framework 235 may be capable of generically handling various forms of relationships, both dependent and permissive, that can be encountered in SaaS applications. As described with reference to FIG. 4, such relationships may be cross computing object, and thus cross-snappable, in which case snapshots of different objects with relationships may have been taken at different times (e.g., between the source snappable and the destination snappable). The restore framework 235 may also handle cascading to cross-snappable data that is the most representative of the environment at the snapshot time of the selected source snappable.

A snappable may be a logical segmentation of data. For example, in some cases, each table in a SaaS application may constitute a snappable. In some cases, a group of related tables in a SaaS application may constitute a snappable. Each snappable may have a corresponding snapshot taken as an independent job (e.g., by the backup framework 225). As such, each snappable may have an independent snapshot chain. When cascading across snappable boundaries, the restore framework 235 may resolve, identify, or determine the snapshot to be used for the destination key. For example, if a snapshot of a source computing object (e.g., snapshot of a computing object to be restored that references another computing object) is to be restored, the restore framework 235 may identify the snapshot of the destination computing object (e.g., the computing object that is referenced by the source computing object) that is nearest in time to the selected key that resulted in the destination key's discovery (e.g., the snapshot of the destination computing object that is nearest in time to the snapshot that will be used to restore the source computing object). For example, if a selected key A cascaded to B, then to C, then to D, then D may be recovered from the existing snapshot for D snapshot nearest in time to the snapshot that will be used for recovery of A.

The definition of relationships for the restore framework 235 may be flexible to address different SaaS application use cases. The definitions of relationships may also be simple to configure and support nuanced behaviors such as linking, which may involve updating only the reference to another record in a table row and no other fields in the table row. At a high level, for each SaaS application, the restore framework of the DMS 110-*a* may consider if a child computing object cascading to a parent computing object a required relationship (e.g., strictly dependent. In such cases, restoring the child computing object may demand first restoring or checking that a version of the parent computing object exists at the target restore environment before restoring the child computing object to the target restore environment. At a high level, for each SaaS application, the restore framework 235 of the DMS 110-*a* also may consider what is the behavior when cascading from parent computing object to child computing object if the parent computing object is created during the restore (e.g., for a permissive relationship). For example, such behavior may include re-creating the link for the child computing object that already exists at the target restore environment (link restore), creating the child computing object (e.g., restoring the child computing object to the target restore environment if the child computing object does not exist at the target restore environment, which may be referred to as a create restore), or updating the child computing object (e.g., restoring the child computing object using the nearest in time snapshot to the snapshot used to restore the parent computing object regardless of whether the child computing object already exists at the target restore environment, which may be referred to as an update restore). Additionally, or alternatively, such behavior may also include whether to restore a child computing object upon restore of a parent computing object (e.g., whether to restore particular computing objects in permissive relationships with target computing objects).

When a nature of a relationship is determined, the relationship metadata may be configured accordingly by the restore framework 235. For example, the restore framework 235 may handle resolution of the keys and operations performed on them based on the relationship definition (e.g., a permutation of the defined behaviors for the different types of relationships). For example, an administrative user of the DMS 110-*a* may configure, for each computing object or for each SaaS application, the types of restore operations to apply to different relationships and/or computing objects. For example, the cascading restore configurations for a particular computing object may be stored as metadata in the relational storage 245 in association with the snapshots for the particular computing object. For example, for a particular computing object, the restore logic may indicate for each parent computing object of the particular computing object (e.g., each computing object for which the particular computing object is in a child/dependent relationship), whether to perform a create restore, a link restore, or an update restore. As another example, for the particular computing object, the restore logic may indicate for each child computing object of the particular computing object (e.g., each computing object for which the particular computing object is in a parent/permissive relationship): whether to restore the child computing object, and if so, whether to perform a create restore, a link restore, or an update restore. In some examples, an administrative user of the DMS 110-*a* may configure the restore logic for a particular computing object (e.g., via a UI controlled by the view framework 230). In some examples, an administrative user of the DMS 110-*a* may configure restore logic per SaaS application (e.g., via a UI controlled by the view framework 230), and the restore logic may apply across all computing objects of the SaaS application. Table 3 shows an example of a relationship metadata model for restore logic for a particular computing object.

TABLE 3

```
message RelationshipMetadata {
    ChildBehavior parent_to_child = 1;
    ParentBehavior child_to_parent = 2;
    // metadata can be used to encode snappable-specific information, such as
    // destination table key prefixes for cascading optimization. bytes metadata = 3;
}
// BehaviorType enumerates the different types of behaviors that can be used
// during restore operations. The enums below represent valid combinations of
// the following 3 independent behaviors:
    // create bool: Whether to create the object if it does not exist.
    // link bool: Whether to update only the link, if the object exists and is
        // orphaned
    // update bool: Whether to update the fields of an object if it already
        // exists. This refers to updating all fields other than the
        // link field. This is useful when an environment can contain
        // stale fields.
// While it may be possible to have 8 combinations of the above attributes, the
// below 4 combinations are valid.
enum BehaviorType {
    // False for all of the above properties. NONE = 1;
    // Only link is True.
    JUST_LINK_BACK_ORPHANS = 2;
    // Link and Create are True
    CREATE_AND_LINK = 3;
    // All 3 attributes are true.
    UPDATE_OR_CREATE_AND_LINK = 4;
}
message ParentBehavior {
    // isRequired is true if recovery fails without cascading. This is used to
    // conditionally allow a customer to unselect a parent relationship during
    // recovery configuration. E.g. if isRequired is false, a customer can
    // unselect a subtree to prevent cascading, but if isRequired is true, the
    // unselect operation is blocked. bool is_required = 1;
}
message ChildBehavior {
    // whenParentIsCreated specifies the behavior when the parent is created.
    BehaviorType when_parent_is_created = 1;
    // whenParentIsUpdated specifies the behavior when the parent is updated.
    BehaviorType when_parent_is_updated = 2;
    // isRequired is true if recovery fails without cascading.
    bool is_required = 3;
}
```

In some examples, as described herein, the restore logic may be dependent on the target restore environment. For example, for a restore to a production environment, where the other computing objects already exist, the restore logic may involve more linking and create restores, while for a restore to a sandbox or testing environment, where the other computing objects may not exist, the restore logic may involve more create and update restores.

The restore framework 235 may handle polymorphic relationship types. A polymorphic relationship may be a relationship that has a destination that may be one of many different types. For example, a UserOrGroup relationship in Salesforce may be either a 'User' or 'Group' object. When considering a polymorphic relationship that may have thousands of possible destinations, cascading to restore every one of those relationships at the target restore environment may be computationally costly and data-intensive. Accordingly, a filtering algorithm may be used such that the cascading framework of the restore framework 235 may handle filtering of non-relevant column values per destination, pruning the scope of the cascading recovery.

Figure 3:
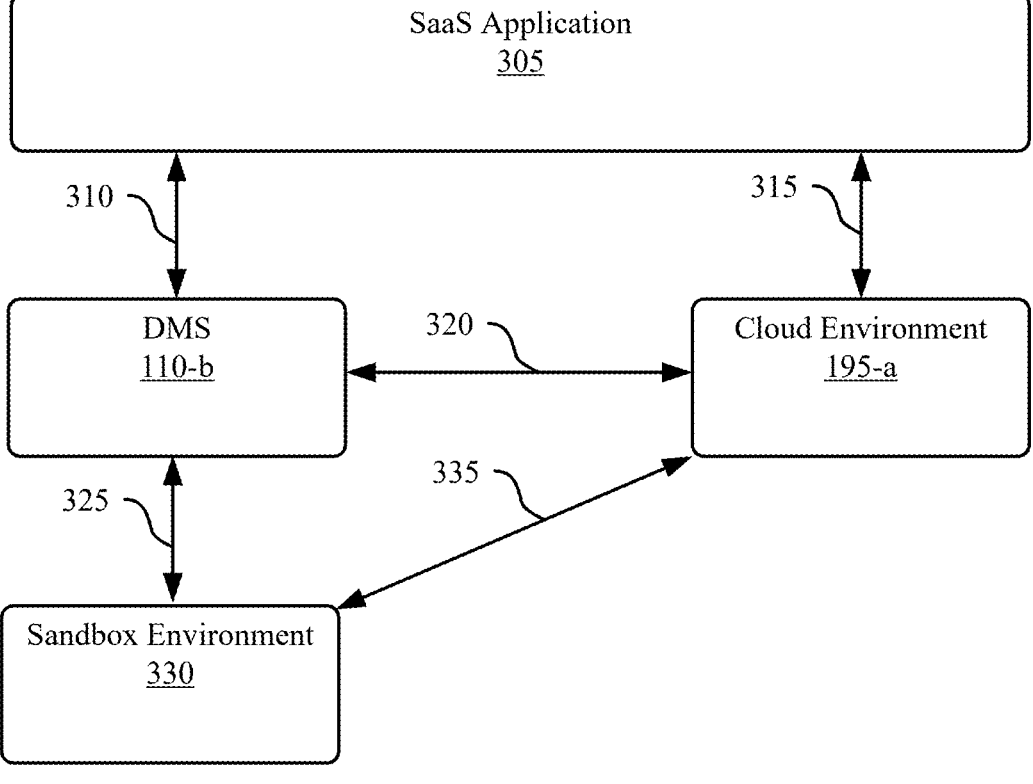
FIG. 3 shows an example of a computing environment that supports cascading recovery framework for SaaS data in accordance with aspects of the present disclosure.

FIG. 3 shows an example of a computing environment 300 that supports cascading recovery framework for SaaS data in accordance with aspects of the present disclosure. The computing environment 300 may implement or may be implemented by aspects of the computing environment 100 or the data protection and recovery system 200. For example, the computing environment 300 may include a DMS 110-b, which may be an example of a DMS 110 as described herein. As another example, the computing environment 300 may include a cloud environment 195-a, which may be an example of a cloud environment 195 as described herein. For example, the cloud environment 195-a may be a Microsoft Azure cloud computing platform.

A SaaS application 305 may be hosted in a distributed environment (e.g., a first storage environment). The DMS 110-b may retrieve information stored at the Saas application via a set of APIs 310 (e.g., REST APIs). The DMS 110-b may communicate via a network connection 320 with the cloud environment 195-a. In some examples, the DMS 110-b may transfer snapshots from the DMS 110-b to the cloud environment 195-a (e.g., a second storage environment) via the network connection 320. In some examples, based on a command from the DMS 110-b, the cloud environment 195-a may retrieve information stored at the SaaS application via a set of APIs 315 (e.g., REST APIs).

Similarly, for restore functions, in some examples, the DMS 110-b may retrieve snapshots from the cloud environment 195-a via the network connection and may restore the snapshots to the SaaS application 305 via the set of APIs 310. In other examples, for restore functions, the DMS 110-b may send a command to the cloud environment 195-a indicating the snapshots to restore, and the cloud environment 195-a may restore the indicated snapshots to the SaaS application 305 via the set of APIs 315.

For an organization that is a customer of a SaaS application, the organization may be represented as a set of computing objects (e.g., snappables) in a hierarchy. The computing objects may be defined for that SaaS application through an interface (e.g., at the corresponding SaaS data protection application 205 as described with reference to FIG. 2), and once defined, the application framework 210 as described with reference to FIG. 2 for the DMS 110-*b* may add new objects, remove or archive old objects, and update existing objects. For example, upon initial backup of a SaaS application for an organization, the DMS 110-*b* may use a discovery job to determine the computing objects within the SaaS application for that organization via calling the set of APIs 310 associated with the SaaS application. The DMS 110-*b* may use a refresh job to update the set of active computing objects (e.g., snappables) in an organization or site by making API calls via the set of APIs 310 and updating the hierarchy in the database (e.g., the relational storage 245 as described with reference to FIG. 2).

For example, discovery interfaces that may be implemented by the DMS 110-*b* may include: 1) GetNextBatch ( ) which queries the next page of APU results and returns a managed object batch with contains all details of that managed computing object: 2) GetManagedObjectType ( ) which indicates the managed object type that the object iterator handles; and 3) Close (taskUpdater,tcConfig) which may be called when the DMS 110-*b* has completed iterating the batches. Any custom tasks for a SaaS workflow may be added after the GetManagedObjectType ( ) interface (e.g., to write any bookkeeping done during the batch retrieval to the task configuration for subsequent tasks to utilize). In some examples, the DMS 110-*b* may perform a refresh job periodically. For example, every X duration, the DMS 110-*b* may fetch all of the computing objects associated with an organization or site for a SaaS application and identify the differences between the new set of computing objects and the last set of computing objects for the organization or site for the SaaS application to discover and archive the current set of computing objects.

As described herein, definition of relationships for the restore framework of the DMS 110-*b* may be flexible to address different SaaS application use cases. Accordingly, restore logic for particular computing objects may be stored in association with the computing objects. As described herein, the restore logic may configure which computing objects in permissive relationships with a particular computing object to restore when the particular computing object is restored, the types of restore operations to apply for each of the selected computing objects in permissive relationships with the particular computing object, as well as the types of restore operations to apply for each of the parent computing objects for the particular computing object.

In some examples, the restore logic may be dependent on the target restore environment. For example, a computing object may be restored to the SaaS application 305 (e.g., the production environment) or to a sandbox environment 330 for testing (e.g., via a set of APIs 325 or a set of APIs 335). In some examples, relationships may be mutated depending on the destination restore environment. For example, the restore framework of the DMS 110-*b* (e.g., the restore framework 235) may include a relationship mutator algorithm that may apply to discovered relationships depending on the target restore environment. For example, if the restore framework detects that the target restore environment is a destination other than the production environment (e.g., other than the SaaS application 305), the relationship mutator algorithm may change all restore operations to update or create for the first depth of the cascade. A depth of cascade may refer to the level of cascading relationship. For example, if computing object A points to computing object B, computing object B points to computing object C, and computing object C points to computing object D, then computing object A has a first level cascading relationship with computing object B, a second level cascading relationship with computing object C, and a third level cascading relationship with computing object D.

In some examples, the restore framework may limit the cascade depth. For example, with some SaaS applications such as Salesforce, there may be an immense volume of relationships within an organization, and thus the depth of cascading for restoration may be limited. For example, the restore logic may allow configuration of a maximum cascade depth to explore for permissive relationships, after which only dependent relationships for a particular computing object to be restored may be explored and discovered. Limiting the cascade depth may enable performant cascading, while preventing failures in recoveries from missing dependencies.

Figure 4:
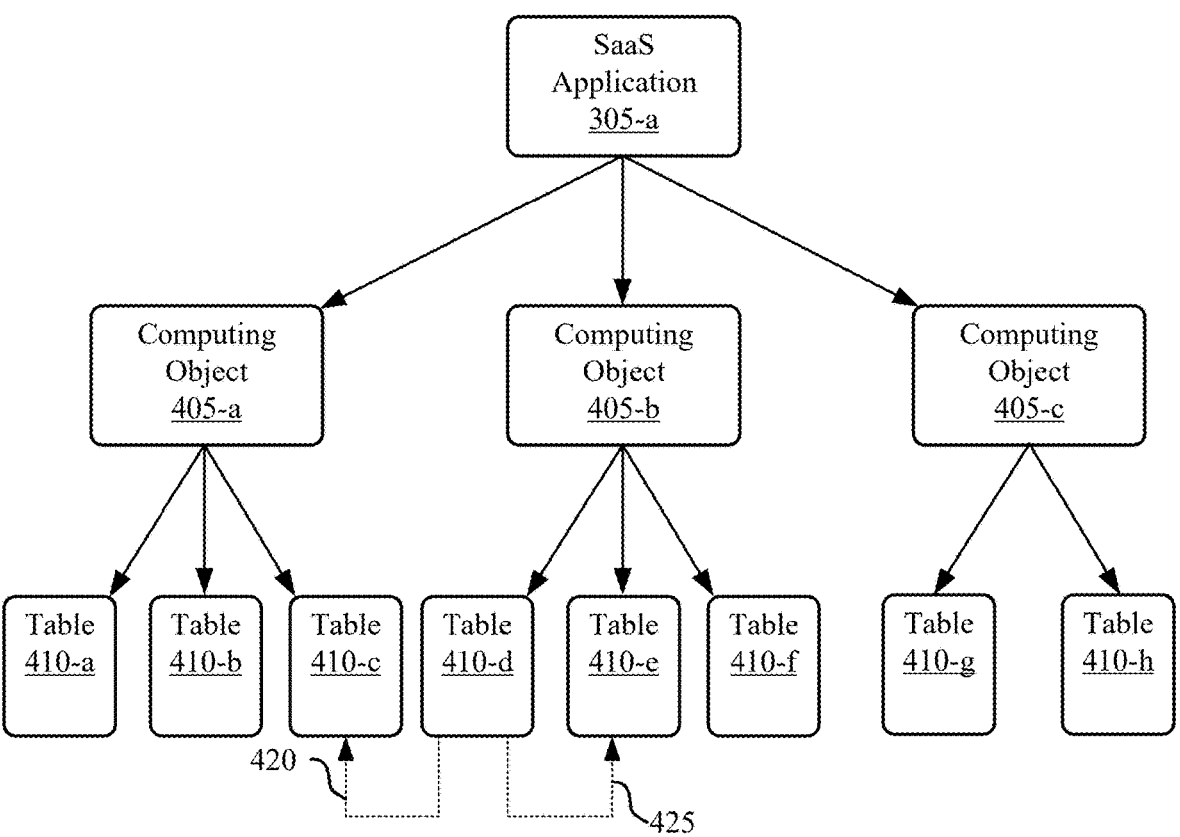
FIG. 4 shows an example of a relational diagram of a SaaS application that supports cascading recovery framework for SaaS data in accordance with aspects of the present disclosure.

FIG. 4 shows an example of a relational diagram of a SaaS application 400 that supports cascading recovery framework for SaaS data in accordance with aspects of the present disclosure. The relational diagram of a SaaS application 400 may implement or may be implemented by aspects of the computing environment 100, the data protection and recovery system 200, or the computing environment 300.

Each SaaS application 305-*a* includes a set of computing objects 405 (e.g., a computing object 405-*a*, a computing object 405-*b*, and a computing object 405-*c*) as shown. Each computing object 405 may involve a separate restore job and a separate backup job. For example, each computing object 405 may correspond to a different snappable (e.g., may be captured as different snapshots). At backup side (e.g., in the relational storage 245 described with reference to FIG. 2), each computing object may store data in multiple tables.

Each computing object 405 may include a set of tables 410. For example, the data of the computing object 405-*a* may be stored in a table 410-*a*, a table 410-*b*, and a table 410-*c*. As another example, the data of the computing object 405-*b* may be stored in a table 410-*d*, a table 410-*e* and a table 410-*f*. As another example, the data of the computing object 405-*c* may be stored in a table 410-*g* and a table 410-*h*. In some examples, a computing object may be a single table.

Table design at a high level may depend on multiple factors. For example, such factors may include the logical entities of the SaaS application, the REST APIs of the SaaS application, deduplication (e.g., bulky contents that do not change often may be split into separate tables by design, such as an issue comments table and an issues table), and the static or dynamic nature of tables in the application. For example, Salesforce may add custom tables across snapshots.

There may be a many: many (many to many) relationship between restore or backup APIs and tables 410. Accordingly, multiple tables may be backed up or restored via a single API, which may complicate generalization of backup and restore jobs as the interfaces may be independently implemented at the snappable level. Accordingly a DMS 110 may implement a logical restore unit and a logical storage unit, where a logical restore unit may be referred to as a logical entity.

Tables 410 may have permissive or dependent relationships between each other, as described herein. For example, the table 410-*d* may have a row that points to the table 410-*c*, and thus may have a permissive relationship 420 with the table 410-*d*. As another example, the table 410-*d* may be a child of the table 410-*e*, and thus may be in a dependent relationship 425 with table 410-*e*. Accordingly, a restore operation for table 410-*d* may involve performing, in accordance with the configured restore logic for table 410-*d*, a restore operation for table 410-*e* prior to restoring the table 410-*d* and a restore operation for table 410-*c*. Correspondingly, the table 410-*e* may be in a permissive (e.g., parent) relationship with the table 410-*d*.

Figure 5:
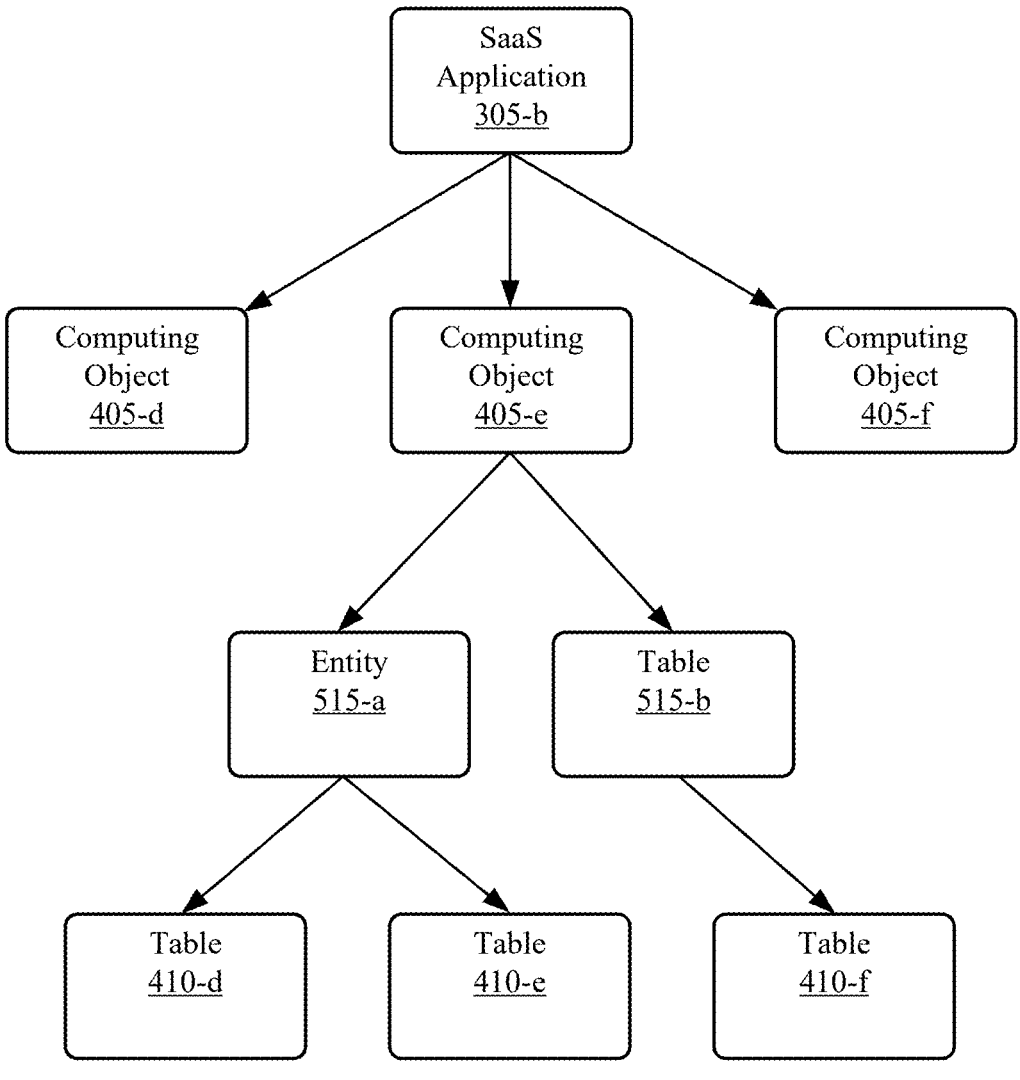
FIG. 5 shows an example of a relational diagram of a SaaS application that supports cascading recovery framework for SaaS data in accordance with aspects of the present disclosure.

FIG. 5 shows an example of a relational diagram of a SaaS application 500 that supports cascading recovery framework for SaaS data in accordance with aspects of the present disclosure. The relational diagram of a SaaS application 500 may implement or may be implemented by aspects of the computing environment 100, the data protection and recovery system 200, the computing environment 300, or the hierarchical diagram of a SaaS application 400.

As described herein, each SaaS application 305-*b* includes a set of computing objects 405 (e.g., a computing object 405-*d*, a computing object 405-*e*, and a computing object 405-*f*) as shown. Each computing object 405 may include a set of tables 410. For example, the data of the computing object 405-*e* may be stored in a table 410-*d*, a table 410-*e*, and a table 410-*f*. As described above, to simplify backup and restore operations for relational SaaS applications, tables 410 may be grouped into logical entities 515, where a logical entity includes a group of tables 410 associated with a same set of APIs for backup or restore operations. For example, the table 410-*d* and the table 410-*e* may be included in the first entity 515-*a* and the table 410-*f* may be included in the second entity 515-*b*.

An entity 515 may be a single unit for backup or restoration operations. An entity 515 may be a group of tables 410 which are associated with a same source API (or same set of source APIs) via which the DMS 110 performs backup or restoration operations for the SaaS application. For example, in JIRA, "Issues" may be an entity which contains IssueMetadata, IssueData, IssueComment, and IssueAttachment tables. For example, all tables 410 which are restored via the same API may below to the same entity 515. One computing object or snappable may have multiple entities 515, and each entity 515 may have multiple tables. Each entity 515 has at least one table. Table relationships may be within any two tables, within an entity 515, or across entities 515. There may be no restriction on the kinds of relationships within tables of the same entity. For example, relationships may be permissive or dependent as described herein. An entity may be defined as: Entity: List [Tables]. The concept of an entity allows the DMS 110 to generalize jobs for every new Saas application by implementing interfaces at an entity level. Table 4 shows an example entity interface. The functions GetBackupRecordsBatchIterator ( ) and RestoreRecordsBatch ( ) are defined below.

TABLE 4

```
type Entity interface {
    // Unique identifier for the entity across a particular SaaS
    app.
    func Entity Name( ) string
    // Latest set of DAOs for all the tables in this entity
    func GetDAOs( ) [ ]*DAO
    // Returns true if this entity supports incremental ingest
    func Supports IncrementalIngest( ) bool
    func GetBackupRecordsBatchIterator(
    snapshotNum int,
    syncToken string,
    commitToken string,
    ) *BackupRecordsBatchIterator, error
    func RestoreRecordsBatch(
    iterator *PrimaryKeyIterator,
```

TABLE 4-continued

```
    restoreRunner RestoreTaskRunner,
    location *RestoreLocation
    ) error
}
```

As entities are collections of tables, entities may support both static and dynamic tables. A single entity may be static or dynamic. For example, a single entity may include static tables or may include dynamic tables. In some examples, a single entity may not include both static and dynamic tables.

As described above, in JIRA, the "Issues" may be an entity which contains IssueMetadata, IssueData, IssueComment, and IssueAttachment tables An example table schema of a project (e.g., Issues) snappable in JIRA may be represented as the list of DAO objects in code returned from the GetDAOs ( ) function as: [ ] StaticDao {& IssureMetaData { }, & IssueData { }, &IssueComment { }, &IssueAttachment { }, & Project { } }.

Each snappable or computing object 405 may be a set of entities 515. When building a new application (e.g., a SaaS data protection application 205 for a new SaaS application to backup as described with reference to FIG. 2), the DMS 110 may first determine the hierarchy of computing objects 405 within the SaaS application. The DMS 110 may identify the entities of each computing object 405 and the tables 410 within each entity 515 along with the table schemas. The DMS 110 may first determine the DAOs, followed by entity implementation. The DMS 110 may use a SaasSnappable interface to specify the entities in a current computing object 405, where an example of the SaasSnappable interface is shown in Table 5.

TABLE 5

```
type SaasSnappable interface {
    // Returns the latest set of entities of this snappable.
    func GetEntities( ) [ ]*Entity
}
```

The SaasSnappable interface may support both static and dynamic entities 515. For example, in Atlassian, each of the entities may be static (e.g., include only static tables) and the list of entities may depend on the type of the computing object 405. For a dynamic computing object, for example, as in some Salesforce computing objects, a list of specific entities may be returned based on the configuration of the computing object.

In some examples, the DMS 110 may split tables 410 into multiple tables to assist with deduplication. For example, an Issue table in JIRA may be split into separate IssueMetadata, IssueComments, and IssueAttachments tables.

Relationships may denote cascading and ordering for restore operations. Relationship information may be added to cascade from one table to another. Relationship information may not be added for foreign key mapping. For example, there may be no reason for cascading or ordering to add relationship information between an IssueMetadata table and an IssueComments table in JIRA as these tables may not have parent-child relationships between them, though they may share a same parent. In some examples, table relationship directed graphs (e.g., from parent to child) may not have loops, except for self-loops. In some examples, entity relationship directed graphs (e.g., from parent to child) may not have loops, except for self-loops. In some examples, the DMS 110 may run a periodic validator job or operation may per organization (e.g., customer of a SaaS application) to validate such constraints across snappables or computing objects for that organization.

As described with reference to FIG. 2, the backup framework 225 may be a generic backup taskchain for all relational SaaS computing objects which have a common implementation built on top of the entities defined per SaaS computing object. The data backup phase performed by the backup framework 225 may be divided into two parts: 1) schema backup; and 2) data backup.

The schema backup phase may make any modifications to the schema (e.g., the schema and the outgoing references) of the tables for each entity. A temporally first snapshot of a particular computing object may create the table(s) in the computing object and may initialize the outgoing references (e.g., references to parent tables and child tables). The schema backup phase may be performed for subsequent snapshots of a computing object if there are modifications to one or more tables in the computing object. The schema backup phase may iterate over all of the entities in a computing object and may retrieve the latest DAOs of all of the tables in each entity to check if the schema has changed since the last snapshot. Once the schema backup phase is complete, the DMS 110-a may store a synchronization token to store the place of the backup operation. The DMS 110-a may synchronize the schemas in the relational storage 245 based on the scheme backup phase (e.g., using a synchronization token).

The data backup phase may be performed after the schema backup phase. In the data backup phase, data may be fetched or retrieved from the source SaaS application and written into the relational storage 245 in the identified schema format (e.g., identified in the schema backup phase). The data backup phase involves fetching or retrieving relevant data from APIs, transforming the data into DAO objects, and ingesting the DAOs into the datastore (e.g., the relational storage 245). For example, the backup of one page of API objects may be split into the following stages: 1) fetch a page of API objects: 2) convert the page to DAO objects; and 3) ingest the DAO objects into datastore (e.g., the relational storage 245). The first and second stages may be specific to each snappable type and may be defined by the entity interface. The third stage may be generalized across entities.

For relational SaaS applications, the third stage may be generalized by iterating over all the entities in each computing object. Each entity may have its own backup function which may provide the records for all of the tables included in the entity. The order of entities to backup may be important to avoid conflicts during restoration operations as entities may be interrelated. For example, a child entity may be backed up before a parent entity to minimize conflicts (e.g., as additions of child objects may be more common than deletions). The ordering of tables within an entity may be handled within the entity definition.

The BackupRecordsBatchIterator interface described above in Table 4 may define a function to fetch records of an entity in batches to backup. The BackupRecordsBatchIterator interface may hold next page information and may specify whether to synchronize or commit each table in the entity. Each entity may have its own implementation of the BackupRecordsBatchIterator interface. An example of the BackupRecordsBatchIterator interface is provided in table 6, where each entity has its own BackupRecordsBatchIterator interface.

TABLE 6

```
type BackupRecordsBatchIterator interface {
    Next( ) [ ]DAO
    ShouldSync( ) (bool, SyncTokenString)
}
Entity {
    GetBackupRecordsBatchIterator(
    snapshotNum int,
    syncToken string,
    commitToken string,
    ) BackupRecordsBatchIterator
}
```

As shown in table 6, the per entity BackupRecordsBatchIterator interface method may be used to define the first and second stages of the data backup by fetching all records of the tables in the given entity in a paginated way and converting the fetched records into the table DAOs. A common backup function may handle iterating through the entities and ingesting DAOs into the relational storage, and in some examples, along with resiliency and resumability re-d.uirements. For example, a function RelationalSaas SnapshotRunner Impl may fetch entities to backup first, and then may proceed to backup each entity individually (e.g., in the relational storage). Each entity backup phase may involve schema backup and data backup, as described herein. A snapshot runner may track which backups of which entities have been completed for resumability purposes. For example, the DMS 110-a may use synchronization tokens for resumability purposes (e.g., after each entity is complete or within an entity after every X records, where X may be an entity level decision). Synchronization tokens may have details encoded which indicate which entities have been completely or partially backed up, and if partially backed up, up until which point. Table 7 shows an example of a RelationalSaasSnapshotRunnerImpl function.

TABLE 7

```
type RelationalSaaSSnapshotRunnerImpl struct {
    func Run(
        exoConfig,
        snappableAdapter,
        snapshotResultChannel)
    error {
        entities = snappableAdapter.GetEntities( )
        // Backup Schema
        EntitySchemaBackupRunner(entities, snapshotNum).Run( )
        // Entities backup needs to be ordered. We backup child first and then
        parents to minimize conflicts (assumption - addition of entries at the source
        is more common than deletes).
        orderedEntities = OrderEntitiesBasedOnSchemaRelationships(entities)
        // Backup data
        for entity:= range orderedEntities {
            EntityDataBackupRunner(entity).Backup(snapshotNum)
            // Sync at the end of every entity
```

TABLE 7-continued

```
        Zeus.Sync(syncToken)
      }
    }
  }
}
type EntityDataBackupRunner struct {
  EntityAdapter *Entity
  SnappableID UUID
  // Backup performs a new backup of the entity.
  Backup(snapshotNum int) {
    snap Writer = NewZeusSnapshotWriter(SnappableID, snapshotNum)
    prevCommitToken = ' '
    if SupportsIncrementalIngest && snapshotNum > 1 {
      prevCommitToken = FetchPreviousSnapCommitToken( )
    }
    prevSyncToken = FetchLatestSyncTokenInCurrSnapshot( )
     it = EntityAdapter.GetBackupRecordsBatchIterator(
      snapshotNum, prevSyncToken, prevCommitToken)
    for {
      shouldSync, syncToken = it.ShouldSync( )
      if shouldSync {
        snapWriter.Sync(syncToken)
      }
      recordsBatch = it.Next( )
      IngestRecordsToZeusWithDedupe(recordsBatch)
    }
    if!EntityAdapter.SupportsIncrementalIngest( ) {
      HandleAlwaysFullDeletes( )
    }
    snapWriter.Commit(commitToken)
  }
}
```

The backup framework 225 may also be responsible for handling skipping items in tables or entities (e.g., based on errors), retries based on errors in the relational storage 245, and fail safe full requests.

The restore framework 235 may control restore operations for each SaaS application. The view framework 230 may enable browse and search functions on a UI, for example, as described with reference to FIG. 6. For example, browse and search functions may enable an administrator of the DMS 110-*a* to narrow down relevant records or to restore to a particular destination. The browse and search functions may be interactive.

Relational SaaS computing objects may have cascading demands, meaning that a selection to restore one table or computing object for a customer or organization may result in a number of other restores via cascading. Cascading may be dependent on a number of factors such as snappable type, relationships between tables, and customer selected options.

Figure 6:
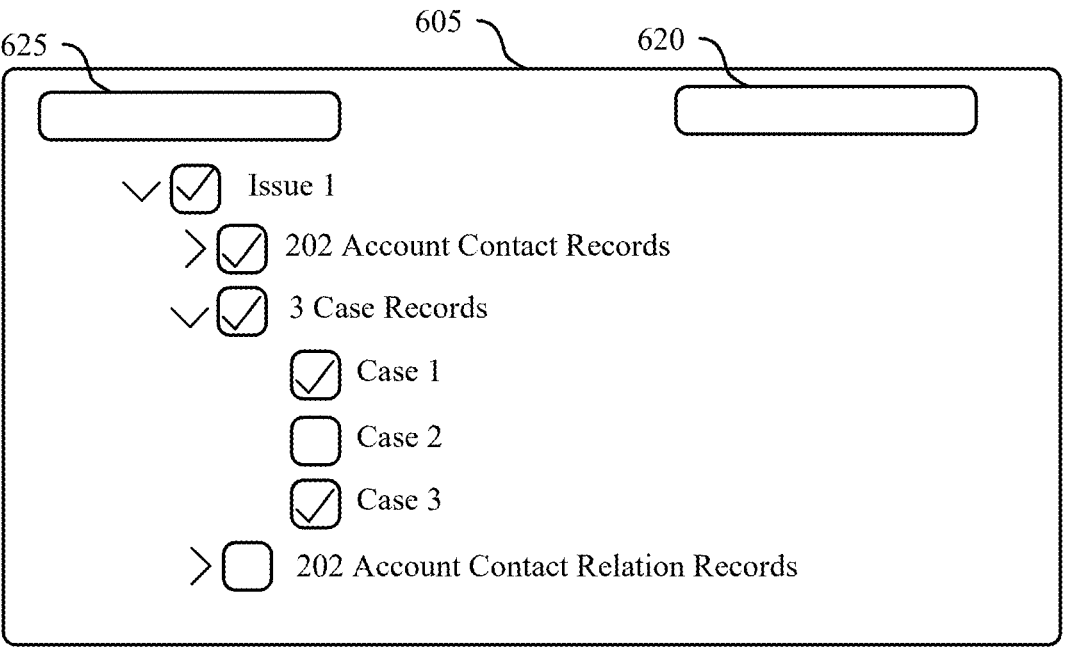
FIG. 6 shows an example of a user interface view that supports cascading recovery framework for SaaS data in accordance with aspects of the present disclosure.

The view framework 230 may provide an application specific UI to customers to select rows to restore along with the snapshot from which to restore (e.g., which point in time). The UI may also provide customization options that may drive the cascading criteria. The cascading effects of a particular selection may be shown to the customer or administrator on the UI, and the customer or administrator may be allowed to select or deselect cascading effects to restore, for example, as shown in FIG. 6.

Once the customer or administrator makes a final selection of items to restore, that information may be sent to the restore framework 235 for a restore job. Cascading may be based on the tables stored in the relational storage 245 for the given SaaS application and may be determined based on entity relationships. Actual restorations may occur on an entity basis.

A table graph may be a graph where each node is a table and edges are relationships between the tables. In some examples, except for self-loops, table graphs may not have any cycles (e.g., dependency loops). The view framework

230 may compute a table graph for selected tables, and the displayed cascading effect may be based on the table graph. Example functions TableVertex and TableGraph may be used to generate a table graph as shown in Table 8.

TABLE 8

```
  type TableVertex struct {
    tableName string
    keysToRestore PrimaryKeyIterator
    // If false, we have not yet cascaded from this node.
    hasCascaded bool
    children [ ]*TableVertex
    parents [ ]*Table Vertex
  } type TableGraph struct {
    // mapping of snappable id. to snapshot num.
    snapshotNums map<string>int
    vertices [ ]*TableVertex
  }
```

In some examples, because a record (e.g., a row within a table) may reference another record within the same table, the ordering of keys within a same table may also be demanded. Accordingly, a key graph per table vertex in the table graph may be used. The key graph may contain keys in self-relationships. Keys may be ordered based on their depth in the topological sort of the key graph. Any keys not involved in any self-relationships may be ordered arbitrarily.

An entity graph may be a graph where each node is an entity and edges are relationships between the entities. In some examples, except for self-loops, entity graphs may not have any cycles (e.g., dependency loops). A restoration job may compute an entity graph for selected tables. Entity graphs may be constructed using table graphs, where all the tables which belong to the same entity are grouped together into a single node. The child-parent reference from one entity to another may be indicated if there is any child-parent reference from any table of any entity to any other table of another entity. Example functions EntityVertex and Entity-Graph may be used to generate an entity graph as shown in Table 9.

TABLE 9

```
type EntityVertex struct {
    entityName string
    keysToRestore PrimaryKeyIterator
    children [ ]*EntityVertex
    parents [ ]*EntityVertex
}
type EntityGraph struct {
    // mapping of snappable id. to snapshot num.
    snapshotNums map<string>int
    vertices [ ]*EntityVertex
}
```

The DMS 110-*a* may implement a generic algorithm for cascading search that may be applied to all SaaS computing objects. As the table relationship information is encoded in the relational storage 245, the relationships may be traced recursively to find cascading effects for a user to select. The starting point for cascading may be the keys (e.g., tables) that a customer or administrator has requested to restore (e.g., via a UI), which may result in a table graph. The table graph may be passed on to a restore job at the restore framework 235. The inputs for cascading may be the keys to restore (e.g., a primary key iterator which may generally be within a single table) and cascading criteria. In some examples, the cascading criteria may include which relationships to traverse for every node (e.g., in some cases parent relationships may be traversed and in some cases just child relationships may be traversed) which may be provided by the function Entity. CascadingTypes ( ) for each entity. In some examples, the cascading criteria may include any exclusions that the customer or administrator defined in the UI (e.g., which tables not to restore).

Cascading by the view framework 230 may involve creation of a lazy table graph where nodes are tables and the keys to restore in the tables and edges are relationships between the tables based on the cascading criteria. The view framework 230 may perform a breadth-first search (BFS) to identify the keys to restore for every table. The table graph may be referred to as a lazy table graph because the BFS may not be a complete BFS, but may only be completed to show options to the customer or administrator on the UI. For example, only the tables shown on the interface may be shown and not the entirety of the chain of dependencies. A full cascade of the dependencies may be performed by the restore job based on a selection by the customer or administrator on the UI of the user tables to restore. The table dependencies may be in different computing objects. For example, a table in one computing object may be a child of a table in another computing object. In some cases, snapshots of the different computing objects may occur at different times. and in such cases where a selected table in a first computing object depends on a table in a second computing object, the DMS 110-*a* may select for cascading the table in the snapshot of the second computing object that is closest in time to the selected snapshot of the first computing object. Table 10 shows an example of an ExclusionInterface function and a CascadingSearch function which may be used by the view framework 230 to display tables in a hierarchical relationship with a selected table.

TABLE 10

```
type ExclusionInterface interface {
    ShouldExclude(entityName string) bool
}
// Generic library function
func CascadingSearch(
    snappableId string,
    // Keys selected per table
    customerSelectedKeys map[string] PrimaryKeyIterator,
    exclusions ExclusionsInterface) TableGraph {
}
```

In some examples, SaaS applications with a high volume of customizable relationships may result in cyclic dependencies between the tables, which may potentially result in cycles in the entity graph. With cycles in the graph, there may be no definite order in which the entities may be restored. To break the cycles, the restore framework may identify the edges that are optional or loosely related, and may keep a subset of the graph in a way that the cycle breaks. For the edges removed, a post processing task may be added to restore the culled references. The post processing task may run after both the table rows are restored that are present at the two ends of the edge.

As described herein, cascading restore of a computing object of a SaaS application may include permissive and dependent relationships. The BFS cascading framework may be used to restore computing objects in dependent relationships as well as permissive relationships with a target computing object to restore in association with the restore logic for the particular computing object to restore. For example, Table 11 shows cascading logic for the BFS cascading framework for cascading restore of a computing object of a SaaS application for permissive and dependent relationships.

TABLE 11

```
Python
type CascadeConfig struct {
    // SourceChecksEnabled is a flag to enable source checks during
    cascading.
    // This indicates that API calls will be made to determine the existence
    // of restore keys to determine their final recovery operation during
    // the cascade itself, rather than in the restore.
    SourceChecksEnabled bool
    // CascadeDepth is the depth of the cascade. Beyond this depth, only
    // required relationships will be cascaded (provided StrictLimitDepth
    is // false).
    CascadeDepth int
    // StrictLimitDepth indicates that we hard limit the cascade depth, such
    // that NEITHER required nor optional relationships are cascaded
    beyond
    // that depth.
    StrictLimitDepth bool
    // ExcludedPaths is the list of paths to exclude from cascading.
    ExcludedPaths [ ][ ]string
    // KeyDiscoveryCallbackFn is the callback function to be called when
    new keys
    // are discovered during cascading. If nil, nothing is done.
    KeyDiscoveryCallbackFn Cascading
    frameworkKeyDiscoveryCallbackFn
    // SnappableFetcher is a function to fetch Snappables during cascading,
    // as the cascade may execute cross-snappable.
    SnappableFetcher SnappableFetcher
    // DestinationColValFilterFn is a function to filter destination keys based
    // on the relationship metadata. If nil, no filtering is done.
    DestinationColValFilterFn cascade.DestinationColValFilterFn
    // RelationshipMutatorFn is a function to mutate the relationship. If nil,
    // the relationship is kept as-is.
```

TABLE 11-continued

```
RelationshipMutatorFn RelationshipMutatorFn
// RelationshipFilterFn is a function to filter out relationships. If nil
// the relationship is always kept.
RelationshipFilterFn RelationshipFilterFn
}
```

The starting point for cascading involving permissive and dependent relationships may be the keys that the customer of the DMS 110 requested to restore. The result may be a Tablegraph which is passed on to the restore framework 235. The DMS 110 may perform a BFS from vertices that contain those selected keys. The BFS may perform the following until there are no more explored paths: For each relationship and cascade path originating from the table vertex, apply the relationship mutator over the relationship and cascade path so far; apply relationship filtering if configured; and use these relationships to discover keys at the destination vertex. If the cascade path exceeds the cascade depth limit, the cascading framework may cease exploring on this path. The cascading framework may group the source keys by their recovery operation, and for recovery operations that are terminal, the cascading framework may cease exploring from these source keys. The relationship may define a column in the source row that points to the destination column. In such cases, the cascading framework may first apply DestinationColValFilterFn to this column, and if the column has been filtered out, the cascading framework ceases exploring from this source key. The cascading framework may query the destination table using this column value to discover keys at the destination, and may apply recovery operation resolution as described herein. The cascading framework may augment the table graph based on the results, For example, if the destination vertex is the same as the source vertex, this is a self-relationship, and the cascading framework may add an edge between the source and destination keys in the key graph maintained in the table vertex. The cascading framework may group restore keys by table name and append the restore keys to the cascade path. The cascading framework may add the cascade path to the destination vertex if the cascade path is not an excluded path.

Because cascading behavior and operation on child computing objects of a parent computing object may diverge between update and create restore operations of the parent computing object, source checks, where the existence of the key at the SaaS application source is checked, may be performed by the cascading framework to inform the cascading behavior. During key discovery, the cascading framework may use the operation over the origin key, the source check results over the destination key, and the relationship metadata to determine the recovery operation on the destination key. For example, Table 12 shows an example of a recovery operation resolution based on the relationship type and the configured relationship behavior. In Table 12, configured relationship behavior on source refers to the type of restore operation configured for the target computing object for the particular type of relationship, relationship cascading directory refers to the type of relationship, sourceCheck refers to whether the computing object in the relationship with the target computing object exists at the target restore environment, and restore operation type to perform for destination key refers to the restore operation to be performed at the target restore environment for the computing object in the relationship with the target computing object.

TABLE 12

| Configured relationship behavior on source | Relationship cascading directory | sourceCheck (destination key) | Restore Operation Type to perform for destination key |
|---|---|---|---|
| Nil | ParentToChild | N/A | None |
| CREATE_AND_LINK | ParentToChild | True | LINK_TO_PARENT |
| CREATE_AND_LINK | ParentToChild | False | CREATE |
| UPDATE_OR_CREATE_AND_LINK | ParentToChild | True | UPDATE |
| UPDATE_OR_CREATE_AND_LINK | ParentToChild | False | CREATE |
| JUST_LINK_BACK_ORPHANS | ParentToChild | True | LINK_TO_PARENT |
| JUST_LINK_BACK_ORPHANS | ParentToChild | False | None, do not add destination key |
| | ChildtoParent | True | None, do not add destination key |
| | ChildtoParent | False | Create |

Once the view framework 230 has the cascading results, the summary page may be displayed to a customer or administrator who may select or deselect some of the keys to restore. The table graph may be pruned based on the selections from the administrator before being sent to the restore framework 235.

The restore framework 235 may be a generic restore taskchain that may operate with any relational SaaS snappable which has a common implementation built on top of entities defined per SaaS snappable. A restore operation may be a granular restore, a partial restore, or a full restore.

A granular restore may originate from a search or browse function provided by the view framework 230. In a granular restore, the DMS 110-*a* may be provided the exact keys that the customer or administrator selects to restore and then performs a cascade operation to retrieve additional keys from other tables in dependent or permissive relationships with the selected tables (e.g., keys) in accordance with the configured restore logic for the selected keys. For example, the lazy table graph may be provided by the view framework 230, and as part of the restore framework 235, the DMS 110-*a* may construct an entire table graph (e.g., using a BFS) in memory and may convert the entire table graph into an entity graph, which may be used to perform the restoration.

A partial restore may be similar to a granular restore except the volume of information may be higher. For example, a partial restore may involve one or more selected computing objects (e.g., in JIRA, one or more projects). For example, a partial restore may involve restoration of a logical component of an application. In a partial restore, the DMS 110-*a* may be provided partial restore nodes via a table graph and creates a full table graph which may then be converted into an entity graph which may be used to perform the restoration. The keyiterator of the DMS 110-*a* may lack sufficient memory to construct the entire table graph, and accordingly the keyiterator may fetch data lazily (e.g., as needed) in a paginated form.

A full or bulk restore may involve restoring an entire SaaS application for an organization or customer of the SaaS application. A full restore may not involve cascading as each computing object and table may be restored. Full restores may involve ordering. A full restore may involve the DMS 110-*a* creating an entity graph by adding relationships to all of the entities and restoring the entities using the entity graph in an ordered fashion (e.g., parent before child). For full or bulk restores, the fundamental logic may be similar to granular and partial restores, but more parallelism may be involved.

Restore operations may involve a stitching operation. For example, when a record is restored from the relational storage to the SaaS application, the SaaS application may generate a new primary key for the record. For example, when a deleted issue is restored in JIRA, JIRA may create a new Issue ID for the restored Issue. In such a case, when the dependents of the record are also restored (for example, parent issues), the restore job performed by the DMS 110-*a* may stitch back the dependency at the SaaS application with the new ID and not the original ID of the restored record, which process may be referred to as stitching. The scope of the stitching operation may be limited to the restore process. For example, assuming a 100 bytes per key, 1 million entries may use around 200 MB of memory, thus the stitcher may be implemented in memory. In some examples, the stitcher may be implemented in a disk store.

Restore operations may involve other post processing operations based on the new mapping of IDs after the restore of individual records to the SaaS application are completed.

For example, functions that may be called include: a Stitcher interface which replaces old keys with new keys: a function that restores each node in an entity graph in BFS order (e.g., using an Entity. RestoreRecords function): a function that keeps a map of all restored table IDs and passes the map onto the next node: an entity handle function (EntityHandler. Restore) that may return post processing steps which may be called at the end. Restoring all records in an entity may also involve ordering records within the entity if a table has a self-reference.

Additionally, restore operations may involve conflict or dependency resolution operations. Backups or snapshots may not be 100% consistent as there may not be a single API which fetches all entries in a SaaS application at a particular time (e.g., backup operations may occur over a duration of time and may not be instantaneous). Dependencies may be across computing objects, and snapshots of computing objects may occur at different points in time, so it is possible that a dependency of a row in a snapshot of a different computing object may not exist. Such issues may be resolved through a conflict resolution process and may be performed at the end of a restore operation. If a relationship is from one computing object A to another computing object B and the restore operation restores rows from snapshot S1 of computing object A, then the DMS 110-*a* may select the snapshot of the computing object B that is closest to the timestamp of S1 for any dependencies in the computing object B to restore. This snapshot of computing object B may then be used to read the corresponding entries in the dependency. If the dependency was broken, then there may be a partial restore where some links have not been restored. Information regarding broken dependencies may be provided to a customer or administrator through restore events (e.g., via a UI).

FIG. 6 shows an example of a UI view 600 that supports cascading recovery framework for SaaS data in accordance with aspects of the present disclosure. The UI view 600 may implement or may be implemented by aspects of the computing environment 100, the data protection and recovery system 200, or the computing environment 300.

The UI view 600 may be presented on a display 605, which may be a display of a computing device 115 as described herein. For example, the UI view 600 may be presented to a customer or administrator of the DMS 110-*a* via a view framework 230 as described with reference to FIG. 2. The UI view may show an example of a search and browse functionality for cascading restore for a SaaS application.

For example, using a search bar 625, an administrator or customer may search for a computing object or table to restore (e.g., shown as Issue 1). For example, using a search bar 625, an administrator or customer may search for a computing object or table to restore (e.g., shown as Issue 1). The UI view 600 may include selectable elements 610 to select or deselect computing objects or tables to restore. For example, the administrator or customer may select Issue 1. The UI view 600 may lazily display items in hierarchical relationships with the selected computing object or table. For example, the UI view 600 may display the quantity of different categories of computing objects or tables in a hierarchical relationship with the selected computing objects or tables, and the administrator or customer may use a dropdown element 615 to view the items in each category. For example, as shown, 202 account contact records may be in a hierarchical relationship with Issue 1, 3 case records may be in a hierarchical relationship with Issue 1, and 202 Account Contact Relation Records may be in a hierarchical relationship with Issue 1. As shown, the administrator or customer may have selected to view the three case records in a hierarchical relationship with Issue 1, and the administrator or customer may have selected to restore Case 1 and Case 2 but not case 3.

The administrator or customer may submit the restore selection, for example using a submit element 620. The DMS 110 may pass the selection of computing objects or tables to restore to the restore framework 235, and the DMS 110 may restore the selected computing objects or tables to the SaaS application as described herein.

Figure 7:
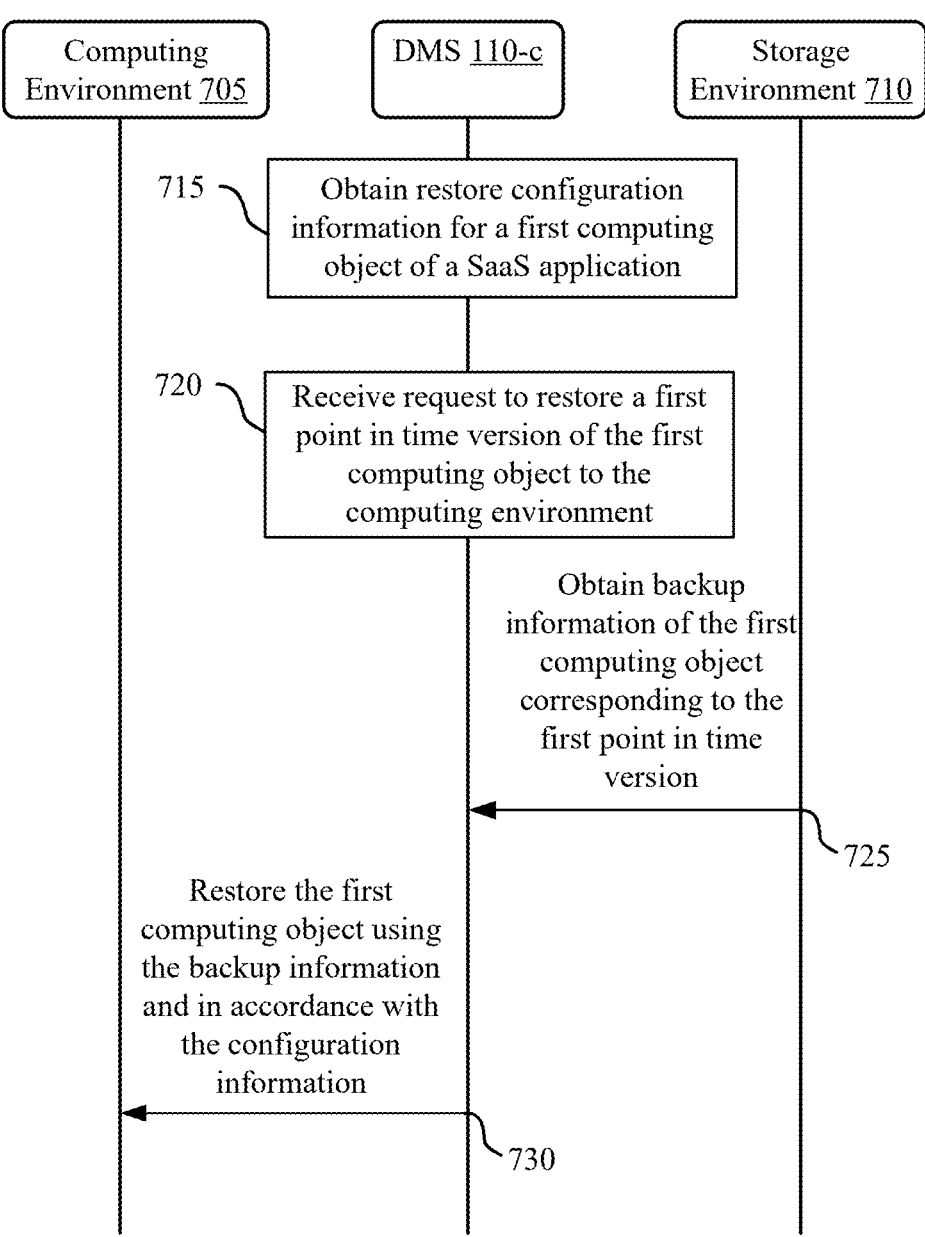
FIG. 7 shows an example of a process flow that supports cascading recovery framework for SaaS data in accordance with aspects of the present disclosure.

FIG. 7 shows an example of a process flow 700 that supports cascading recovery framework for SaaS data in accordance with aspects of the present disclosure. The process flow 700 may implement or may implement aspects of the computing environment 100, the data protection and recovery system 200, the computing environment 300, the relational diagram of a SaaS application 400, the relational diagram of a SaaS application 500, or the UI view 600. For example, the process flow 700 includes a DMS 110-*c* which may be an example of a DMS 110 as described herein. The process flow 700 also includes a computing environment 705, which may be an example of a SaaS application 305 or a sandbox environment 330 as described herein. The process flow 700 also includes a storage environment 710, which may be an example of one or more storage nodes 185, one or more node clusters 196 at a cloud environment 195, or a relational storage 245 as described herein. In the following description of the process flow 700, operations between the computing environment 705, the DMS 110 c, and the storage environment 710 may be added, omitted, or performed in a different order (with respect to the exemplary order shown).

At 715, the DMS 110-*c* may obtain restore configuration information for a first computing object of a SaaS application. The restore configuration information may indicate first respective restore operations associated with a set of second computing objects in respective parent relationships with the first computing object. The restore configuration information also may indicate second respective restore operations associated with a set of third computing objects in respective permissive relationships with the first computing object. In some examples, the DMS 110-*c* may present, via a UI associated with a user account associated with the SaaS application, a set of multiple computing objects in respective permissive relationships with the first computing object, the set of multiple computing objects including the set of third computing objects. In such examples, the DMS 110-*c* may receive, via the UI, a selection of the set of third computing objects from the set of multiple computing objects and the second respective restore operations associated with the set of third computing objects.

At 720, the DMS 110-*c* may receive a request to restore a first point in time version of the first computing object to the computing environment 705. In some examples, the DMS 110-*c* may receive the request via a UI associated with a user account associated with the SaaS application.

At 725, the DMS 110-*c* may obtain, from the storage environment 710, backup information of the first computing object that corresponds to the first point in time version of the first computing object.

At 730, the DMS 110-*c* may restore the first computing object to the computing environment 705 using the backup information and in accordance with the configuration information. For example, restoring the first computing object may involve: performing, by the DMS 110-*c*, the first respective restore operations associated with the set of second computing objects for the computing environment

705; and performing, by the DMS 110-*c*, the second respective restore operations associated with the set of third computing objects for the computing environment 705.

In some examples, the restore configuration information includes an indication to perform a create restore operation for a second computing object of the set of second computing objects. In some such examples, performing the first respective restore operations involves: identifying, based on the indication to perform the create restore operation for the second computing object, an absence of the second computing object at the computing environment 705: obtaining, from the storage environment 710 or a second storage environment and based on the absence of the second computing object at the computing environment 705, second backup information of the second computing object associated with the first point in time version of the first computing object; and restoring, prior to restoring the first computing object to the computing environment 705, the second computing object to the computing environment 705 using the second backup information.

In some examples, the restore configuration information includes an indication to perform a create restore operation for a second computing object of the set of second computing objects. In some such examples, performing the first respective restore operations involves: identifying, based on the indication to perform the create restore operation for the second computing object, a presence of the second computing object at the computing environment 705; and linking, based on the presence of the second computing object at the computing environment 705, an address of the second computing object at the computing environment 705 to the first computing object at the computing environment 705.

In some examples, the restore configuration information includes an indication to perform a create restore operation for a third computing object of the set of third computing objects. In some such examples, performing the second respective restore operations involves: identifying, based on the indication to perform the create restore operation for the third computing object, an absence of the third computing object at the computing environment 705: obtaining, from the storage environment 710 or a second storage environment and based on the absence of the third computing object at the computing environment 705, third backup information of the third computing object associated with the first point in time version of the first computing object; and restoring the third computing object to the computing environment 705 using the third backup information.

In some examples, the restore configuration information includes an indication to perform an update restore operation for a second computing object of the set of second computing objects. In some such examples, performing the first respective restore operations involves: obtaining, from the storage environment 710 or a second storage environment and based on the indication to perform the update restore operation for the second computing object, second backup information of the second computing object associated with the first point in time version of the first computing object; and restoring, prior to restoring the first computing object to the computing environment 705, the second computing object to the computing environment 705 using the second backup information.

In some examples, the restore configuration information includes an indication to perform an update restore operation for a third computing object of the set of third computing objects. In some such examples, performing the second respective restore operations involves: obtaining, from the storage environment 710 or a second storage environment and based on the indication to perform the update restore operation for the third computing object, third backup information of the third computing object associated with the first point in time version of the first computing object; and restoring the third computing object to the computing environment 705 using the third backup information.

In some examples, the restore configuration information includes an indication to perform a link restore operation for a second computing object of the set of second computing objects. In some such examples, performing the first respective restore operations involves: identifying, based on the indication to perform the link restore operation for the second computing object, a presence of the second computing object at the computing environment 705; and linking, based on the presence of the second computing object at the computing environment 705, an address of the second computing object at the computing environment 705 to the first computing object at the computing environment 705.

In some examples, the restore configuration information includes an indication to perform a link restore operation for a third computing object of the set of third computing objects. In some such examples, performing the second respective restore operations involves: identifying, based on the indication to perform the link restore operation for the third computing object, a presence of the third computing object at the computing environment 705; and linking, based on the presence of the third computing object at the computing environment 705, an address of the third computing object at the computing environment 705 to the first computing object at the computing environment 705.

In some examples, the restore configuration information indicates to omit restore operations for a set of fourth computing objects in second respective permissive relationships with the first computing object.

In some examples, the restore configuration information indicates that the first respective restore operations associated with the set of second computing objects in the respective parent relationships with the first computing object and the second respective restore operations associated with the set of third computing objects in the respective permissive relationship with the first computing object are associated with a first set of target restore environments, the first set of target restore environments including the computing environment 705. In such examples, the restore configuration information may indicate that third respective restore operations associated with the set of second computing objects in the respective parent relationships with the first computing object and fourth respective restore operations associated with a set of fourth computing objects in second respective permissive relationships with the first computing object are associated with a second set of target restore environments. For example, the restore operations may be dependent on the target restore environment. In some examples, the set of fourth computing objects is different than the set of third computing objects.

In some examples, obtaining the backup information of the first computing object may involve obtaining a first snapshot from the storage environment 710 that includes the backup information. In some such examples performing the first respective restore operations may involve: obtaining, from the storage environment 710 or a second storage environment, a second snapshot that includes second backup information of a second computing object of the set of second computing objects, where the second snapshot is identified based on the first point in time version of the first computing object; and restoring, prior to restoring the first computing object to the computing environment 705, the second computing object to the computing environment 705 using the second backup information. In some examples, the second snapshot is identified based on a proximity in time to the first snapshot. In some examples, performing the second respective restore operations may involve: obtaining, from the storage environment 710, the second storage environment, or a third storage environment, a third snapshot that includes third backup information of a third computing object of the set of third computing objects, where the third snapshot is identified based on the first point in time version of the first computing object; and restoring the third computing object to the computing environment 705 using the third backup information.

In some examples, the DMS 110-c may identify, based on the request, a set of APIs associated with the SaaS application, where the set of APIs are for access of the first computing object, the set of second computing objects, and the set of third computing objects, and restoring the first computing object and performing the first respective restore operations and the second respective restore operations may be via the set of APIs.

In some examples, the set of third computing objects being in respective permissive relationships with the first computing object may include the first computing object including one or more respective non-dependent pointers to one or more data fields included in the set of third computing objects. In some examples, the set of third computing objects being in respective permissive relationships with the first computing object may include first computing object being a parent computing object for the set of third computing objects.

Figure 8:
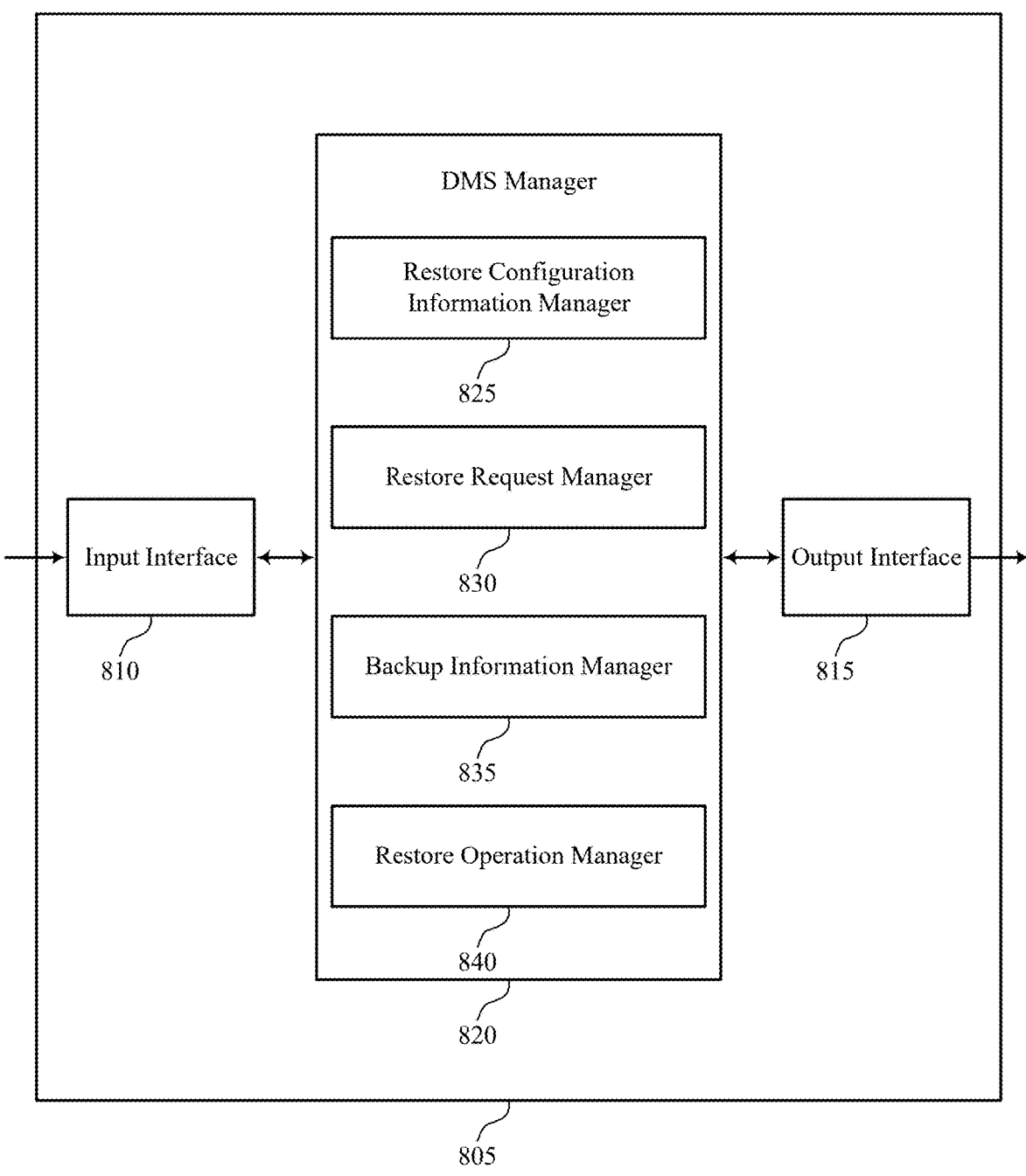
FIG. 8 shows a block diagram of an apparatus that supports cascading recovery framework for SaaS data in accordance with aspects of the present disclosure.

FIG. 8 shows a block diagram 800 of a system 805 that supports cascading recovery framework for SaaS data in accordance with aspects of the present disclosure. In some examples, the system 805 may be an example of aspects of one or more components described with reference to FIG. 1, such as a DMS 110. The system 805 may include an input interface 810, an output interface 815, and a DMS Manager 820. The system 805 may also include one or more processors. Each of these components may be in communication with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the DMS Manager 820 to support cascading recovery framework for SaaS data. In some cases, the input interface 810 may be a component of a network interface 1025 as described with reference to FIG. 10.

The output interface 815 may manage output signaling for the system 805. For example, the output interface 815 may receive signaling from other components of the system 805, such as the DMS Manager 820, and may transmit such output signaling corresponding to (e.g., representative of or otherwise based on) such signaling to other systems or devices. In some cases, the output interface 815 may be a component of a network interface 1025 as described with reference to FIG. 10.

For example, the DMS Manager 820 may include a restore configuration information manager 825, a restore request manager 830, a backup information manager 835, a restore operation manager 840, or any combination thereof. In some examples, the DMS Manager 820, or various components thereof, may be configured to perform various operations (e.g., receiving, monitoring, transmitting) using or otherwise in cooperation with the input interface 810, the output interface 815, or both. For example, the DMS Manager 820 may receive information from the input interface 810, send information to the output interface 815, or be integrated in combination with the input interface 810, the output interface 815, or both to receive information, transmit information, or perform various other operations as described herein.

The restore configuration information manager 825 may be configured as or otherwise support a means for obtaining, by a DMS, restore configuration information for a first computing object of a SaaS application, where the restore configuration information indicates first respective restore operations associated with a set of second computing objects in respective parent relationships with the first computing object, and where the restore configuration information indicates second respective restore operations associated with a set of third computing objects in respective permissive relationships with the first computing object. The restore request manager 830 may be configured as or otherwise support a means for receiving, by the DMS, a request to restore a first point in time version of the first computing object to a computing environment. The backup information manager 835 may be configured as or otherwise support a means for obtaining, by the DMS and from a storage environment, backup information of the first computing object that corresponds to the first point in time version of the first computing object. The restore operation manager 840 may be configured as or otherwise support a means for restoring, by the DMS, the first computing object to the computing environment using the backup information. In some examples, to restore the first computing object, the restore operation manager 840 may be configured as or otherwise support a means for performing, by the DMS, the first respective restore operations associated with the set of second computing objects for the computing environment, and the restore operation manager 840) may be configured as or otherwise support a means for performing, by the DMS, the second respective restore operations associated with the set of third computing objects for the computing environment.

Figure 9:
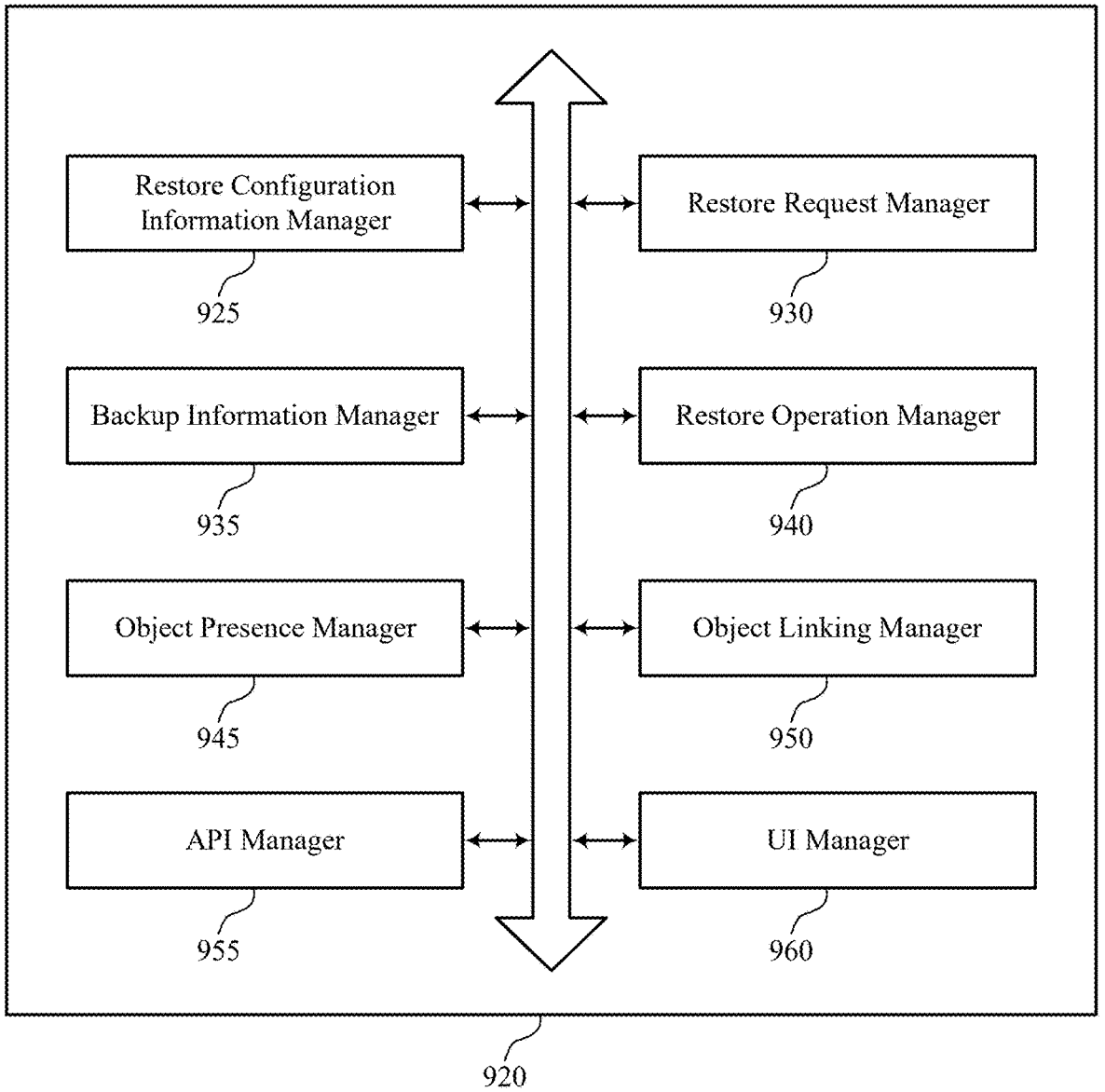
FIG. 9 shows a block diagram of a DMS Manager that supports cascading recovery framework for SaaS data in accordance with aspects of the present disclosure.

FIG. 9 shows a block diagram 900 of a DMS Manager 920 that supports cascading recovery framework for SaaS data in accordance with aspects of the present disclosure. The DMS Manager 920 may be an example of aspects of a DMS Manager or a DMS Manager 820, or both, as described herein. The DMS Manager 920, or various components thereof, may be an example of means for performing various aspects of cascading recovery framework for SaaS data as described herein. For example, the DMS Manager 920 may include a restore configuration information manager 925, a restore request manager 930, a backup information manager 935, a restore operation manager 940, an object presence manager 945, an object linking manager 950, an API manager 955, a UI manager 960, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The restore configuration information manager 925 may be configured as or otherwise support a means for obtaining, by a DMS, restore configuration information for a first computing object of a SaaS application, where the restore configuration information indicates first respective restore operations associated with a set of second computing objects in respective parent relationships with the first computing object, and where the restore configuration information indicates second respective restore operations associated with a set of third computing objects in respective permissive relationships with the first computing object. The restore request manager 930 may be configured as or otherwise support a means for receiving, by the DMS, a request to restore a first point in time version of the first computing object to a computing environment. The backup information manager 935 may be configured as or otherwise support a means for obtaining, by the DMS and from a storage environment, backup information of the first computing object that corresponds to the first point in time version of the first computing object. The restore operation manager 940 may be configured as or otherwise support a means for restoring, by the DMS, the first computing object to the computing environment using the backup information. In some examples, to restore the first computing object, the restore operation manager 940) may be configured as or otherwise support a means for performing, by the DMS, the first respective restore operations associated with the set of second computing objects for the computing environment, and the restore operation manager 940) may be configured as or otherwise support a means for performing, by the DMS, the second respective restore operations associated with the set of third computing objects for the computing environment.

In some examples, the restore configuration information includes an indication to perform a create restore operation for a second computing object of the set of second computing objects. In some examples, to support performing the first respective restore operations, the object presence manager 945 may be configured as or otherwise support a means for identifying, based on the indication to perform the create restore operation for the second computing object, an absence of the second computing object at the computing environment. In some examples, to support performing the first respective restore operations, the backup information manager 935 may be configured as or otherwise support a means for obtaining, from the storage environment or a second storage environment and based on the absence of the second computing object at the computing environment, second backup information of the second computing object associated with the first point in time version of the first computing object. In some examples, to support performing the first respective restore operations, the restore operation manager 940 may be configured as or otherwise support a means for restoring, prior to restoring the first computing object to the computing environment, the second computing object to the computing environment using the second backup information.

In some examples, the restore configuration information includes an indication to perform a create restore operation for a second computing object of the set of second computing objects. In some examples, to support performing the first respective restore operations, the object presence manager 945 may be configured as or otherwise support a means for identifying, based on the indication to perform the create restore operation for the second computing object, a presence of the second computing object at the computing environment. In some examples, to support performing the first respective restore operations, the object linking manager 950) may be configured as or otherwise support a means for linking, based on the presence of the second computing object at the computing environment, an address of the second computing object at the computing environment to the first computing object at the computing environment.

In some examples, the restore configuration information includes an indication to perform a create restore operation for a third computing object of the set of third computing objects. In some examples, to support performing the second respective restore operations, the object presence manager 945 may be configured as or otherwise support a means for identifying, based on the indication to perform the create restore operation for the third computing object, an absence of the third computing object at the computing environment. In some examples, to support performing the second respective restore operations, the backup information manager 935 may be configured as or otherwise support a means for obtaining, from the storage environment or a second storage environment and based on the absence of the third computing object at the computing environment, third backup information of the third computing object associated with the first point in time version of the first computing object. In some examples, to support performing the second respective restore operations, the restore operation manager 940) may be configured as or otherwise support a means for restoring the third computing object to the computing environment using the third backup information.

In some examples, the restore configuration information includes an indication to perform an update restore operation for a second computing object of the set of second computing objects. In some examples, to support performing the first respective restore operations, the backup information manager 935 may be configured as or otherwise support a means for obtaining, from the storage environment or a second storage environment and based on the indication to perform the update restore operation for the second computing object, second backup information of the second computing object associated with the first point in time version of the first computing object. In some examples, to support performing the first respective restore operations, the restore operation manager 940 may be configured as or otherwise support a means for restoring, prior to restoring the first computing object to the computing environment, the second computing object to the computing environment using the second backup information.

In some examples, the restore configuration information includes an indication to perform an update restore operation for a third computing object of the set of third computing objects. In some examples, to support performing the second respective restore operations, the backup information manager 935 may be configured as or otherwise support a means for obtaining, from the storage environment or a second storage environment and based on the indication to perform the update restore operation for the third computing object, third backup information of the third computing object associated with the first point in time version of the first computing object. In some examples, to support performing the first respective restore operations, the restore operation manager 940 may be configured as or otherwise support a means for restoring the third computing object to the computing environment using the third backup information.

In some examples, the restore configuration information includes an indication to perform a link restore operation for a second computing object of the set of second computing objects. In some examples, to support performing the first respective restore operations, the object presence manager 945 may be configured as or otherwise support a means for identifying, based on the indication to perform the link restore operation for the second computing object, a presence of the second computing object at the computing environment. In some examples, to support performing the first respective restore operations, the object linking manager 950 may be configured as or otherwise support a means for linking, based on the presence of the second computing object at the computing environment, an address of the second computing object at the computing environment to the first computing object at the computing environment.

In some examples, the restore configuration information includes an indication to perform a link restore operation for a third computing object of the set of third computing objects. In some examples, to support performing the second respective restore operations, the object presence manager 945 may be configured as or otherwise support a means for identifying, based on the indication to perform the link restore operation for the third computing object, a presence of the third computing object at the computing environment. In some examples, to support performing the second respective restore operations, the object linking manager 950 may be configured as or otherwise support a means for linking, based on the presence of the third computing object at the computing environment, an address of the third computing object at the computing environment to the first computing object at the computing environment.

In some examples, the restore configuration information indicates to omit restore operations for a set of fourth computing objects in second respective permissive relationships with the first computing object.

In some examples, the restore configuration information indicates that the first respective restore operations associated with the set of second computing objects in the respective parent relationships with the first computing object and the second respective restore operations associated with the set of third computing objects in the respective permissive relationship with the first computing object are associated with a first set of target restore environments, the first set of target restore environments including the computing environment. In some examples, the restore configuration information indicates that third respective restore operations associated with the set of second computing objects in the respective parent relationships with the first computing object and fourth respective restore operations associated with a set of fourth computing objects in second respective permissive relationships with the first computing object are associated with a second set of target restore environments. In some examples, the set of fourth computing objects is different than the set of third computing objects.

In some examples, to support obtaining the backup information of the first computing object, the backup information manager 935 may be configured as or otherwise support a means for obtaining a first snapshot from the storage environment that includes the backup information. In some examples, to support performing the first respective restore operations, the backup information manager 935 may be configured as or otherwise support a means for obtaining, from the storage environment or a second storage environment, a second snapshot that includes second backup information of a second computing object of the set of second computing objects, where the second snapshot is identified based on the first point in time version of the first computing object. In some examples, to support performing the first respective restore operations, the restore operation manager 940 may be configured as or otherwise support a means for restoring, prior to restoring the first computing object to the computing environment, the second computing object to the computing environment using the second backup information.

In some examples, to support performing the second respective restore operations, the backup information manager 935 may be configured as or otherwise support a means for obtaining, from the storage environment, the second storage environment, or a third storage environment, a third snapshot that includes third backup information of a third computing object of the set of third computing objects, where the third snapshot is identified based on the first point in time version of the first computing object. In some examples, the restore operation manager 940 may be configured as or otherwise support a means for restoring the third computing object to the computing environment using the third backup information.

In some examples, the backup information manager 935 may be configured as or otherwise support a means for identifying the second snapshot based on a proximity in time to the first snapshot.

In some examples, the API manager 955 may be configured as or otherwise support a means for identifying, by the DMS and based on the request, a set of APIs associated with the SaaS application, where the set of APIs are for access of the first computing object, the set of second computing objects, and the set of third computing objects, and where restoring the first computing object and performing the first respective restore operations and the second respective restore operations is via the set of APIs.

In some examples, to support receiving the request to restore the first point in time version of the first computing object, the UI manager 960 may be configured as or otherwise support a means for receiving the request via a UI associated with a user account associated with the SaaS application.

In some examples, to support obtaining the restore configuration information for the first computing object, the UI manager 960 may be configured as or otherwise support a means for presenting, via a UI associated with a user account associated with the Saas application, a set of multiple computing objects in respective permissive relationships with the first computing object, the set of multiple computing objects including the set of third computing objects. In some examples, to support obtaining the restore configuration information for the first computing object, the UI manager 960 may be configured as or otherwise support a means for receiving, via the UI, a selection of the set of third computing objects from the set of multiple computing objects and the second respective restore operations associated with the set of third computing objects.

In some examples, the set of third computing objects being in respective permissive relationships with the first computing object includes the first computing object including one or more respective non-dependent pointers to one or more data fields included in the set of third computing objects. In some examples, the set of third computing objects being in respective permissive relationships with the first computing object includes the first computing object being a parent computing object for the set of third computing objects.

Figure 10:
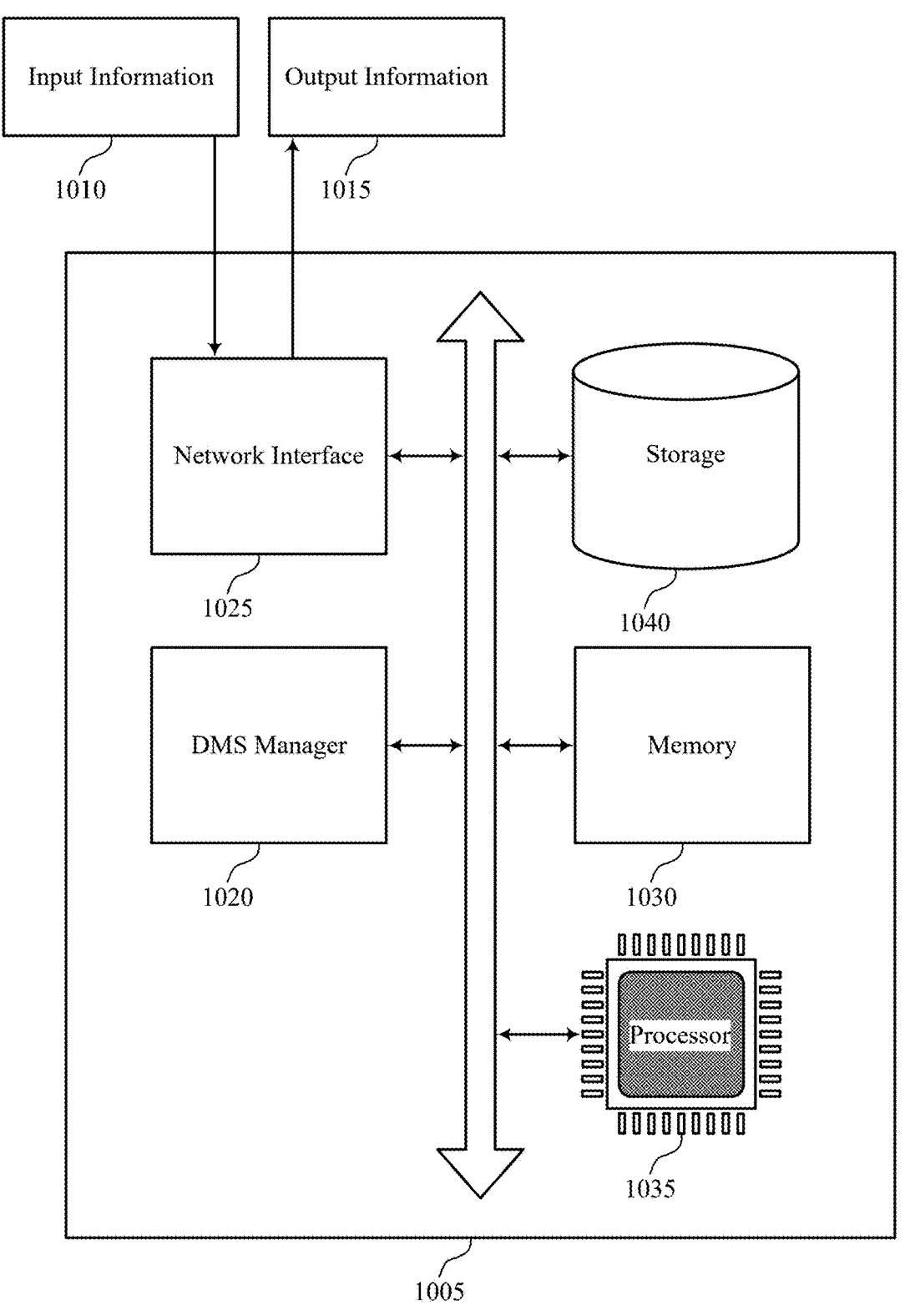
FIG. 10 shows a diagram of a system including a device that supports cascading recovery framework for SaaS data in accordance with aspects of the present disclosure.

FIG. 10 shows a block diagram 1000 of a system 1005 that supports cascading recovery framework for SaaS data in accordance with aspects of the present disclosure. The system 1005 may be an example of or include components of a system 805 as described herein. The system 1005 may include components for data management, including components such as a DMS Manager 1020, an input information 1010, an output information 1015, a network interface 1025, at least one memory 1030, at least one processor 1035, and a storage 1040. These components may be in electronic communication or otherwise coupled with each other (e.g., operatively, communicatively, functionally, electronically, electrically; via one or more buses, communications links, communications interfaces, or any combination thereof). Additionally, the components of the system 1005 may include corresponding physical components or may be implemented as corresponding virtual components (e.g., components of one or more virtual machines). In some examples, the system 1005 may be an example of aspects of one or more components described with reference to FIG. 1, such as a DMS 110.

The network interface 1025 may enable the system 1005 to exchange information (e.g., input information 1010, output information 1015, or both) with other systems or devices (not shown). For example, the network interface 1025 may enable the system 1005 to connect to a network (e.g., a network 120 as described herein). The network interface 1025 may include one or more wireless network interfaces, one or more wired network interfaces, or any combination thereof. In some examples, the network interface 1025 may be an example of may be an example of aspects of one or more components described with reference to FIG. 1, such as one or more network interfaces 165.

Memory 1030 may include RAM, ROM, or both. The memory 1030 may store computer-readable, computer-executable software including instructions that, when executed, cause the processor 1035 to perform various functions described herein. In some cases, the memory 1030 may contain, among other things, a basic input/output system (BIOS), which may control basic hardware or software operation such as the interaction with peripheral components or devices. In some cases, the memory 1030 may be an example of aspects of one or more components described with reference to FIG. 1, such as one or more memories 175.

The processor 1035 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 1035 may be configured to execute computer-readable instructions stored in a memory 1030 to perform various functions (e.g., functions or tasks supporting cascading recovery framework for SaaS data). Though a single processor 1035 is depicted in the example of FIG. 10, it is to be understood that the system 1005 may include any quantity of one or more of processors 1035 and that a group of processors 1035 may collectively perform one or more functions ascribed herein to a processor, such as the processor 1035. In some cases, the processor 1035 may be an example of aspects of one or more components described with reference to FIG. 1, such as one or more processors 170.

Storage 1040 may be configured to store data that is generated, processed, stored, or otherwise used by the system 1005. In some cases, the storage 1040 may include one or more HDDs, one or more SDDs, or both. In some examples, the storage 1040 may be an example of a single database, a distributed database, multiple distributed databases, a data store, a data lake, or an emergency backup database. In some examples, the storage 1040 may be an example of one or more components described with reference to FIG. 1, such as one or more network disks 180.

For example, the DMS Manager 1020 may be configured as or otherwise support a means for obtaining, by a DMS, restore configuration information for a first computing object of a SaaS application, where the restore configuration information indicates first respective restore operations associated with a set of second computing objects in respective parent relationships with the first computing object, and where the restore configuration information indicates second respective restore operations associated with a set of third computing objects in respective permissive relationships with the first computing object. The DMS Manager 1020 may be configured as or otherwise support a means for receiving, by the DMS, a request to restore a first point in time version of the first computing object to a computing environment. The DMS Manager 1020 may be configured as or otherwise support a means for obtaining, by the DMS and from a storage environment, backup information of the first computing object that corresponds to the first point in time version of the first computing object. The DMS Manager 1020 may be configured as or otherwise support a means for restoring, by the DMS, the first computing object to the computing environment using the backup information. In some examples, to restore the first computing object, the DMS Manager 1020 may be configured as or otherwise support a means for performing, by the DMS, the first respective restore operations associated with the set of second computing objects for the computing environment and for performing, by the DMS, the second respective restore operations associated with the set of third computing objects for the computing environment.

By including or configuring the DMS Manager 1020 in accordance with examples as described herein, the system 1005 may support techniques for cascading recovery framework for SaaS data, which may provide one or more benefits such as, for example, improved reliability, reduced latency, improved user experience, more efficient utilization of computing resources, network resources or both, improved scalability, or improved security, among other possibilities.

Figure 11:
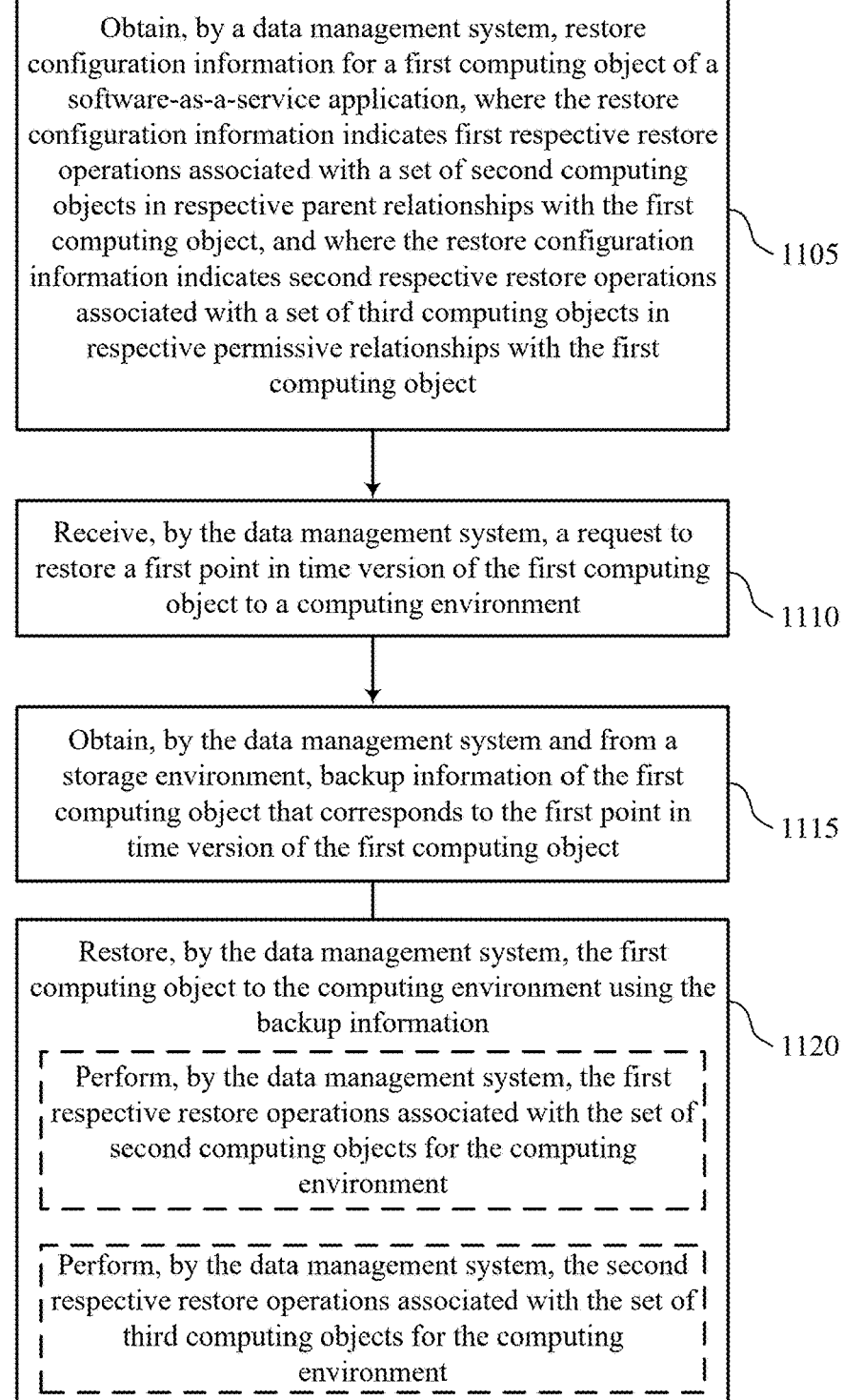
FIG. 11 shows a flowchart illustrating methods that support cascading recovery framework for SaaS data in accordance with aspects of the present disclosure.

FIG. 11 shows a flowchart illustrating a method 1100 that supports cascading recovery framework for SaaS data in accordance with aspects of the present disclosure. The operations of the method 1100 may be implemented by a DMS or its components as described herein. For example, the operations of the method 1100 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1105, the method may include obtaining, by a DMS, restore configuration information for a first computing object of a SaaS application, where the restore configuration information indicates first respective restore operations associated with a set of second computing objects in respective parent relationships with the first computing object, and where the restore configuration information indicates second respective restore operations associated with a set of third computing objects in respective permissive relationships with the first computing object. The operations of 1105 may be performed in accordance with examples as disclosed herein. In some examples, aspects of the operations of 1105 may be performed by a restore configuration information manager 925 as described with reference to FIG. 9.

At 1110, the method may include receiving, by the DMS, a request to restore a first point in time version of the first computing object to a computing environment. The operations of 1110 may be performed in accordance with examples as disclosed herein. In some examples, aspects of the operations of 1110 may be performed by a restore request manager 930 as described with reference to FIG. 9.

At 1115, the method may include obtaining, by the DMS and from a storage environment, backup information of the first computing object that corresponds to the first point in time version of the first computing object. The operations of 1115 may be performed in accordance with examples as disclosed herein. In some examples, aspects of the operations of 1115 may be performed by a backup information manager 935 as described with reference to FIG. 9.

At 1120, the method may include restoring, by the DMS, the first computing object to the computing environment using the backup information. In some examples, restoring the first computing object may include performing, by the DMS, the first respective restore operations associated with the set of second computing objects for the computing environment and performing, by the DMS, the second respective restore operations associated with the set of third computing objects for the computing environment. The operations of 1120 may be performed in accordance with examples as disclosed herein. In some examples, aspects of the operations of 1120 may be performed by a restore operation manager 940 as described with reference to FIG. 9.

The following provides an overview of aspects of the present disclosure:

Aspect 1: A method, comprising: obtaining, by a DMS, restore configuration information for a first computing object of a SaaS application, wherein the restore configuration information indicates first respective restore operations associated with a set of second computing objects in respective parent relationships with the first computing object, and wherein the restore configuration information indicates second respective restore operations associated with a set of third computing objects in respective permissive relationships with the first computing object: receiving, by the DMS, a request to restore a first point in time version of the first computing object to a computing environment; obtaining, by the DMS and from a storage environment, backup information of the first computing object that corresponds to the first point in time version of the first computing object; and restoring, by the DMS, the first computing object to the computing environment using the backup information, wherein restoring the first computing object comprises: performing, by the DMS, the first respective restore operations associated with the set of second computing objects for the computing environment; and performing, by the DMS, the second respective restore operations associated with the set of third computing objects for the computing environment.

Aspect 2: The method of aspect 1, wherein the restore configuration information comprises an indication to perform a create restore operation for a second computing object of the set of second computing objects, and wherein performing the first respective restore operations comprises: identifying, based at least in part on the indication to perform the create restore operation for the second computing object, an absence of the second computing object at the computing environment: obtaining, from the storage environment or a second storage environment and based at least in part on the absence of the second computing object at the computing environment, second backup information of the second computing object associated with the first point in time version of the first computing object; and restoring, prior to restoring the first computing object to the computing environment, the second computing object to the computing environment using the second backup information.

Aspect 3: The method of any of aspects 1 through 2, wherein the restore configuration information comprises an indication to perform a create restore operation for a second computing object of the set of second computing objects, and wherein performing the first respective restore operations comprises: identifying, based at least in part on the indication to perform the create restore operation for the second computing object, a presence of the second computing object at the computing environment; and linking, based at least in part on the presence of the second computing object at the computing environment, an address of the second computing object at the computing environment to the first computing object at the computing environment.

Aspect 4: The method of any of aspects 1 through 3, wherein the restore configuration information comprises an indication to perform a create restore operation for a third computing object of the set of third computing objects, and wherein performing the second respective restore operations comprises: identifying, based at least in part on the indication to perform the create restore operation for the third computing object, an absence of the third computing object at the computing environment: obtaining, from the storage environment or a second storage environment and based at least in part on the absence of the third computing object at the computing environment, third backup information of the third computing object associated with the first point in time version of the first computing object; and restoring the third computing object to the computing environment using the third backup information.

Aspect 5: The method of any of aspects 1 through 4, wherein the restore configuration information comprises an indication to perform an update restore operation for a second computing object of the set of second computing objects, and wherein performing the first respective restore operations comprises: obtaining, from the storage environment or a second storage environment and based at least in part on the indication to perform the update restore operation for the second computing object, second backup information of the second computing object associated with the first point in time version of the first computing object; and restoring, prior to restoring the first computing object to the computing environment, the second computing object to the computing environment using the second backup information.

Aspect 6: The method of any of aspects 1 through 5, wherein the restore configuration information comprises an indication to perform an update restore operation for a third computing object of the set of third computing objects, and wherein performing the second respective restore operations comprises: obtaining, from the storage environment or a second storage environment and based at least in part on the indication to perform the update restore operation for the third computing object, third backup information of the third computing object associated with the first point in time version of the first computing object; and restoring the third computing object to the computing environment using the third backup information.

Aspect 7: The method of any of aspects 1 through 6, wherein the restore configuration information comprises an indication to perform a link restore operation for a second computing object of the set of second computing objects, and wherein performing the first respective restore operations comprises: identifying, based at least in part on the indication to perform the link restore operation for the second computing object, a presence of the second computing object at the computing environment; and linking, based at least in part on the presence of the second computing object at the computing environment, an address of the second computing object at the computing environment to the first computing object at the computing environment.

Aspect 8: The method of any of aspects 1 through 7, wherein the restore configuration information comprises an indication to perform a link restore operation for a third computing object of the set of third computing objects, and wherein performing the second respective restore operations comprises: identifying, based at least in part on the indication to perform the link restore operation for the third computing object, a presence of the third computing object at the computing environment; and linking, based at least in part on the presence of the third computing object at the computing environment, an address of the third computing object at the computing environment to the first computing object at the computing environment.

Aspect 9: The method of any of aspects 1 through 8, wherein the restore configuration information indicates to omit restore operations for a set of fourth computing objects in second respective permissive relationships with the first computing object.

Aspect 10: The method of any of aspects 1 through 9, wherein the restore configuration information indicates that the first respective restore operations associated with the set of second computing objects in the respective parent relationships with the first computing object and the second respective restore operations associated with the set of third computing objects in the respective permissive relationship with the first computing object are associated with a first set of target restore environments, the first set of target restore environments comprising the computing environment; and the restore configuration information indicates that third respective restore operations associated with the set of second computing objects in the respective parent relationships with the first computing object and fourth respective restore operations associated with a set of fourth computing objects in second respective permissive relationships with the first computing object are associated with a second set of target restore environments.

Aspect 11: The method of aspect 10, wherein the set of fourth computing objects is different than the set of third computing objects.

Aspect 12: The method of any of aspects 1 through 11, wherein obtaining the backup information of the first computing object comprises: obtaining a first snapshot from the storage environment that includes the backup information, and wherein performing the first respective restore operations comprises: obtaining, from the storage environment or a second storage environment, a second snapshot that includes second backup information of a second computing object of the set of second computing objects, wherein the second snapshot is identified based on the first point in time version of the first computing object; and restoring, prior to restoring the first computing object to the computing environment, the second computing object to the computing environment using the second backup information.

Aspect 13: The method of aspect 12, wherein performing the second respective restore operations comprises: obtaining, from the storage environment, the second storage environment, or a third storage environment, a third snapshot that includes third backup information of a third computing object of the set of third computing objects, wherein the third snapshot is identified based on the first point in time version of the first computing object; and restoring the third computing object to the computing environment using the third backup information.

Aspect 14: The method of any of aspects 12 through 13, wherein the second snapshot is identified based at least in part on a proximity in time to the first snapshot.

Aspect 15: The method of any of aspects 1 through 14, further comprising: identifying, by the DMS and based at least in part on the request, a set of APIs associated with the SaaS application, wherein the set of APIs are for access of the first computing object, the set of second computing objects, and the set of third computing objects, and wherein restoring the first computing object and performing the first respective restore operations and the second respective restore operations is via the set of APIs.

Aspect 16: The method of any of aspects 1 through 15, wherein receiving the request to restore the first point in time version of the first computing object comprises: receiving the request via a UI associated with a user account associated with the Saas application.

Aspect 17: The method of any of aspects 1 through 16, wherein obtaining the restore configuration information for the first computing object comprises: presenting, via a UI associated with a user account associated with the SaaS application, a plurality of computing objects in respective permissive relationships with the first computing object, the plurality of computing objects comprising the set of third computing objects; and receiving, via the UI, a selection of the set of third computing objects from the plurality of computing objects and the second respective restore operations associated with the set of third computing objects.

Aspect 18: The method of any of aspects 1 through 17, wherein the set of third computing objects being in respective permissive relationships with the first computing object comprises the first computing object comprising one or more respective non-dependent pointers to one or more data fields included in the set of third computing objects, or wherein the set of third computing objects being in respective permissive relationships with the first computing object comprises the first computing object being a parent computing object for the set of third computing objects.

Aspect 19: An apparatus comprising one or more memories storing processor-executable code, and one or more processors coupled with the one or more memories and individually or collectively operable to execute the code to cause the apparatus to perform a method of any of aspects 1 through 18.

Aspect 20: An apparatus comprising at least one means for performing a method of any of aspects 1 through 18.

Aspect 21: A non-transitory computer-readable medium storing code the code comprising instructions executable by one or more processors to perform a method of any of aspects 1 through 18.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
obtaining, by a data management system, restore configuration information for a first computing object of a software-as-a-service application, wherein the restore configuration information indicates first respective restore operations associated with a set of second computing objects in respective parent relationships with the first computing object, and wherein the restore configuration information indicates second respective restore operations associated with a set of third computing objects in respective permissive relationships with the first computing object;

receiving, by the data management system, a request to restore a first point in time version of the first computing object to a computing environment;
obtaining, by the data management system and from a storage environment, backup information of the first computing object that corresponds to the first point in time version of the first computing object; and
restoring, by the data management system, the first computing object to the computing environment using the backup information, wherein restoring the first computing object comprises:
performing, by the data management system, the first respective restore operations associated with the set of second computing objects for the computing environment; and
performing, by the data management system, the second respective restore operations associated with the set of third computing objects for the computing environment.

2. The method of claim 1, wherein the restore configuration information comprises an indication to perform a create restore operation for a second computing object of the set of second computing objects, and wherein performing the first respective restore operations comprises:
identifying, based at least in part on the indication to perform the create restore operation for the second computing object, an absence of the second computing object at the computing environment;
obtaining, from the storage environment or a second storage environment and based at least in part on the absence of the second computing object at the computing environment, second backup information of the second computing object associated with the first point in time version of the first computing object; and
restoring, prior to restoring the first computing object to the computing environment, the second computing object to the computing environment using the second backup information.

3. The method of claim 1, wherein the restore configuration information comprises an indication to perform a create restore operation for a second computing object of the set of second computing objects, and wherein performing the first respective restore operations comprises:
identifying, based at least in part on the indication to perform the create restore operation for the second computing object, a presence of the second computing object at the computing environment; and
linking, based at least in part on the presence of the second computing object at the computing environment, an address of the second computing object at the computing environment to the first computing object at the computing environment.

4. The method of claim 1, wherein the restore configuration information comprises an indication to perform a create restore operation for a third computing object of the set of third computing objects, and wherein performing the second respective restore operations comprises:
identifying, based at least in part on the indication to perform the create restore operation for the third computing object, an absence of the third computing object at the computing environment;
obtaining, from the storage environment or a second storage environment and based at least in part on the absence of the third computing object at the computing environment, third backup information of the third computing object associated with the first point in time version of the first computing object; and restoring the third computing object to the computing environment using the third backup information.

5. The method of claim 1, wherein the restore configuration information comprises an indication to perform an update restore operation for a second computing object of the set of second computing objects, and wherein performing the first respective restore operations comprises:

obtaining, from the storage environment or a second storage environment and based at least in part on the indication to perform the update restore operation for the second computing object, second backup information of the second computing object associated with the first point in time version of the first computing object; and restoring, prior to restoring the first computing object to the computing environment, the second computing object to the computing environment using the second backup information.

6. The method of claim 1, wherein the restore configuration information comprises an indication to perform an update restore operation for a third computing object of the set of third computing objects, and wherein performing the second respective restore operations comprises:

obtaining, from the storage environment or a second storage environment and based at least in part on the indication to perform the update restore operation for the third computing object, third backup information of the third computing object associated with the first point in time version of the first computing object; and restoring the third computing object to the computing environment using the third backup information.

7. The method of claim 1, wherein the restore configuration information comprises an indication to perform a link restore operation for a second computing object of the set of second computing objects, and wherein performing the first respective restore operations comprises:

identifying, based at least in part on the indication to perform the link restore operation for the second computing object, a presence of the second computing object at the computing environment; and linking, based at least in part on the presence of the second computing object at the computing environment, an address of the second computing object at the computing environment to the first computing object at the computing environment.

8. The method of claim 1, wherein the restore configuration information comprises an indication to perform a link restore operation for a third computing object of the set of third computing objects, and wherein performing the second respective restore operations comprises:

identifying, based at least in part on the indication to perform the link restore operation for the third computing object, a presence of the third computing object at the computing environment; and linking, based at least in part on the presence of the third computing object at the computing environment, an address of the third computing object at the computing environment to the first computing object at the computing environment.

9. The method of claim 1, wherein the restore configuration information indicates to omit restore operations for a set of fourth computing objects in second respective permissive relationships with the first computing object.

10. The method of claim 1, wherein:

the restore configuration information indicates that the first respective restore operations associated with the set of second computing objects in the respective parent relationships with the first computing object and the second respective restore operations associated with the set of third computing objects in the respective permissive relationship with the first computing object are associated with a first set of target restore environments, the first set of target restore environments comprising the computing environment; and the restore configuration information indicates that third respective restore operations associated with the set of second computing objects in the respective parent relationships with the first computing object and fourth respective restore operations associated with a set of fourth computing objects in second respective permissive relationships with the first computing object are associated with a second set of target restore environments.

11. The method of claim 10, wherein the set of fourth computing objects is different than the set of third computing objects.

12. The method of claim 1, wherein obtaining the backup information of the first computing object comprises:

obtaining a first snapshot from the storage environment that includes the backup information, and wherein performing the first respective restore operations comprises:

obtaining, from the storage environment or a second storage environment, a second snapshot that includes second backup information of a second computing object of the set of second computing objects, wherein the second snapshot is identified based on the first point in time version of the first computing object; and restoring, prior to restoring the first computing object to the computing environment, the second computing object to the computing environment using the second backup information.

13. The method of claim 12, wherein performing the second respective restore operations comprises:

obtaining, from the storage environment, the second storage environment, or a third storage environment, a third snapshot that includes third backup information of a third computing object of the set of third computing objects, wherein the third snapshot is identified based on the first point in time version of the first computing object; and restoring the third computing object to the computing environment using the third backup information.

14. The method of claim 12, wherein the second snapshot is identified based at least in part on a proximity in time to the first snapshot.

15. The method of claim 1, further comprising:

identifying, by the data management system and based at least in part on the request, a set of application programming interfaces associated with the software-as-a-service application, wherein the set of application programming interfaces are for access of the first computing object, the set of second computing objects, and the set of third computing objects, and wherein restoring the first computing object and performing the first respective restore operations and the second respective restore operations is via the set of application programming interfaces.

16. The method of claim 1, wherein receiving the request to restore the first point in time version of the first computing object comprises:

receiving the request via a user interface associated with
a user account associated with the software-as-a-ser-
vice application.

17. The method of claim 1, wherein obtaining the restore
configuration information for the first computing object
comprises:

presenting, via a user interface associated with a user
account associated with the software-as-a-service
application, a plurality of computing objects in respec-
tive permissive relationships with the first computing
object, the plurality of computing objects comprising
the set of third computing objects; and receiving, via the user interface, a selection of the set of
third computing objects from the plurality of comput-
ing objects and the second respective restore operations
associated with the set of third computing objects.

18. The method of claim 1, wherein:

the set of third computing objects being in respective
permissive relationships with the first computing object
comprises the first computing object comprising one or
more respective non-dependent pointers to one or more
data fields included in the set of third computing
objects, or the set of third computing objects being in respective
permissive relationships with the first computing object
comprises the first computing object being a parent
computing object for the set of third computing objects.

19. An apparatus, comprising:

one or more memories storing processor-executable code;
and one or more processors coupled with the one or more
memories and individually or collectively operable to
execute the code to cause the apparatus to:

obtain, by a data management system, restore configu-
ration information for a first computing object of a
software-as-a-service application, wherein the
restore configuration information indicates first
respective restore operations associated with a set of
second computing objects in respective parent rela-
tionships with the first computing object, and
wherein the restore configuration information indi-
cates second respective restore operations associated
with a set of third computing objects in respective
permissive relationships with the first computing
object;

receive, by the data management system, a request to
restore a first point in time version of the first
computing object to a computing environment;

obtain, by the data management system and from a
storage environment, backup information of the first computing object that corresponds to the first point
in time version of the first computing object; and restore, by the data management system, the first com-
puting object to the computing environment using
the backup information, wherein, to restore the first
computing object, the one or more processors are
individually or collectively operable to execute the
code to cause the apparatus to:

perform, by the data management system, the first
respective restore operations associated with the
set of second computing objects for the computing
environment; and perform, by the data management system, the second
respective restore operations associated with the
set of third computing objects for the computing
environment.

20. A non-transitory computer-readable medium storing
code, the code comprising instructions executable by one or
more processors to:

obtain, by a data management system, restore configura-
tion information for a first computing object of a
software-as-a-service application, wherein the restore
configuration information indicates first respective
restore operations associated with a set of second
computing objects in respective parent relationships
with the first computing object, and wherein the restore
configuration information indicates second respective
restore operations associated with a set of third com-
puting objects in respective permissive relationships
with the first computing object;

receive, by the data management system, a request to
restore a first point in time version of the first comput-
ing object to a computing environment;

obtain, by the data management system and from a
storage environment, backup information of the first
computing object that corresponds to the first point in
time version of the first computing object; and restore, by the data management system, the first com-
puting object to the computing environment using the
backup information, wherein, to restore the first com-
puting object, the instructions are executable by the one
or more processors to:

perform, by the data management system, the first
respective restore operations associated with the set
of second computing objects for the computing envi-
ronment; and perform, by the data management system, the second
respective restore operations associated with the set
of third computing objects for the computing envi-
ronment.

* * * * *